US012591210B2

(12) United States Patent
Rodriguez Ramirez

(10) Patent No.: US 12,591,210 B2
(45) Date of Patent: Mar. 31, 2026

(54) APPARATUS, METHOD, AND COMPUTER-READABLE STORAGE MEDIUM

(71) Applicant: Yokogawa Electric Corporation, Tokyo (JP)

(72) Inventor: Juan Esteban Rodriguez Ramirez, Tokyo (JP)

(73) Assignee: Yokogawa Electric Corporation, Tokyo (JP)

( * ) Notice: Subject to any disclaimer, the term of this patent is extended or adjusted under 35 U.S.C. 154(b) by 338 days.

(21) Appl. No.: 18/177,107

(22) Filed: Mar. 1, 2023

(65) Prior Publication Data

US 2023/0280701 A1 Sep. 7, 2023

(30) Foreign Application Priority Data

Mar. 3, 2022 (JP) ................................. 2022-032962

(51) Int. Cl.
*G05B 13/02* (2006.01)
(52) U.S. Cl.
CPC ................................ *G05B 13/0265* (2013.01)
(58) Field of Classification Search
CPC ...... G05B 13/0265; G05B 2219/24069; G05B 2219/24075; G05B 2219/2609; G05B 23/0221
See application file for complete search history.

(56) References Cited

U.S. PATENT DOCUMENTS

| | | | |
|---|---|---|---|
| 2019/0012553 A1 | 1/2019 | Maruchi | |
| 2021/0240177 A1* | 8/2021 | Fujii | ..................... G05B 13/02 |
| 2021/0333768 A1 | 10/2021 | Umemoto | |

FOREIGN PATENT DOCUMENTS

| | | |
|---|---|---|
| EP | 3796228 A1 | 3/2021 |
| JP | 6453504 B1 | 1/2019 |
| JP | 2019016209 A | 1/2019 |
| JP | 2021124886 A | 8/2021 |
| JP | 2021174397 A | 11/2021 |

(Continued)

OTHER PUBLICATIONS

Extended European Search Report for counterpart European Application No. 23159604.0, issued by the European Patent Office on Aug. 14, 2023.

(Continued)

*Primary Examiner* — Kenneth M Lo

(57) ABSTRACT

An apparatus is provided comprising a first acquisition unit for acquiring a data set including a plurality of types of measurement data indicating a state of an object, a supplying unit for supplying, in response to the data set being input, the data set acquired by the first acquisition unit to a model that outputs a state indication value indicating classification of a state of the object, a first identification unit for identifying, when one of the state indication value is output from the model in response to one of the data set being supplied, at least one type of measurement data, among the plurality of types of measurement data, having a larger influence on the one state indication value than a reference, based on the one data set, and a display control unit for displaying the one state indication value and the at least one type of measurement data.

23 Claims, 15 Drawing Sheets

(56) References Cited

FOREIGN PATENT DOCUMENTS

SG        10201601558 A      10/2017

OTHER PUBLICATIONS

Nadia Burkart, et al. A Survey on the Explainability of Supervised Machine Learning. Section 6.2.2., "Counterfactual Methods". Journal of Artificial Intelligence Research, Jan. 2021. vol. 70.

Marco Tulio Ribeiro et. al., Why should I trust you? Explaining the predictions of any classifier, Proceedings of the 22nd ACM SIGKDD international conference on knowledge discovery and data mining, Aug. 9, 2016, ACM(2016), Internet [URL : https://arxiv.org/abs/1602.04938].

Scott M. Lundberg et. al., A unified approach to interpreting model predictions, Advances in Neural Information Processing Systems, Nov. 25, 2017, USA, Internet [URL: https://arxiv.org/abs/1705.07874].

Francesco Bodria et. al., Benchmarking and Survey of Explanation Methods for Black Box Models, Feb. 25, 2021, Internet [URL: https://arxiv.org/abs/2102.13076].

Ramaravind K. Mothilal et. al., Explaining Machine Learning Classifiers through Diverse Counterfactuals Explanations, Conference on Fairness, Accountability, and Transparency (FAT 2020), Dec. 6, 2019, Spain, Internet [URL: https://arxiv.org/abs/1905.07697].

Office Action issued for counterpart Japanese Application No. 2022-032962, transmitted from the Japanese Patent Office on Nov. 28, 2023 (drafted on Nov. 22, 2023).

* cited by examiner

SELECT MODIFIABLE DATA

| | MEASURE-MENT DATA | LOWER LIMIT VALUE | UPPER LIMIT VALUE |
|---|---|---|---|
| ☑ | B4 | -2.7650 | 1.9053 |
| ☑ | A2 | 0.0000 | 1.0000 |
| ☐ | B6 | -- | -- |
| ☑ | Cc1 | 0.0010 | -- |
| ☐ | Ab7 | -- | 0.5000 |

☐ SELECT ALL

FIG.13

APPARATUS, METHOD, AND COMPUTER-READABLE STORAGE MEDIUM

The contents of the following Japanese patent application (s) are incorporated herein by reference:
NO. 2022-032962 filed in JP on Mar. 3, 2022

BACKGROUND

1. Technical Field

The present invention relates to an apparatus, a method, and a computer-readable storage medium.

2. Related Art

Patent document 1 describes that "the output unit 12c outputs, with sensor data collected by the collection unit 12a as an input, the abnormality degree of each detection target equipment 20, respectively, by using each model".

PRIOR ART DOCUMENT

Patent Document

Patent Document 1: Japanese Patent No. 6453504

BRIEF DESCRIPTION OF THE DRAWINGS

FIG. 13 illustrates an example of a selection screen of modifiable data.

DESCRIPTION OF EXEMPLARY EMBODIMENTS

Hereinafter, the present invention will be described through embodiments of the invention, but the following embodiments do not limit the invention according to the claims. In addition, not all combinations of features described in the embodiments necessarily have to be essential to solving means of the invention.

1. First Embodiment

1.1. Configuration of System 1

Figure 1:
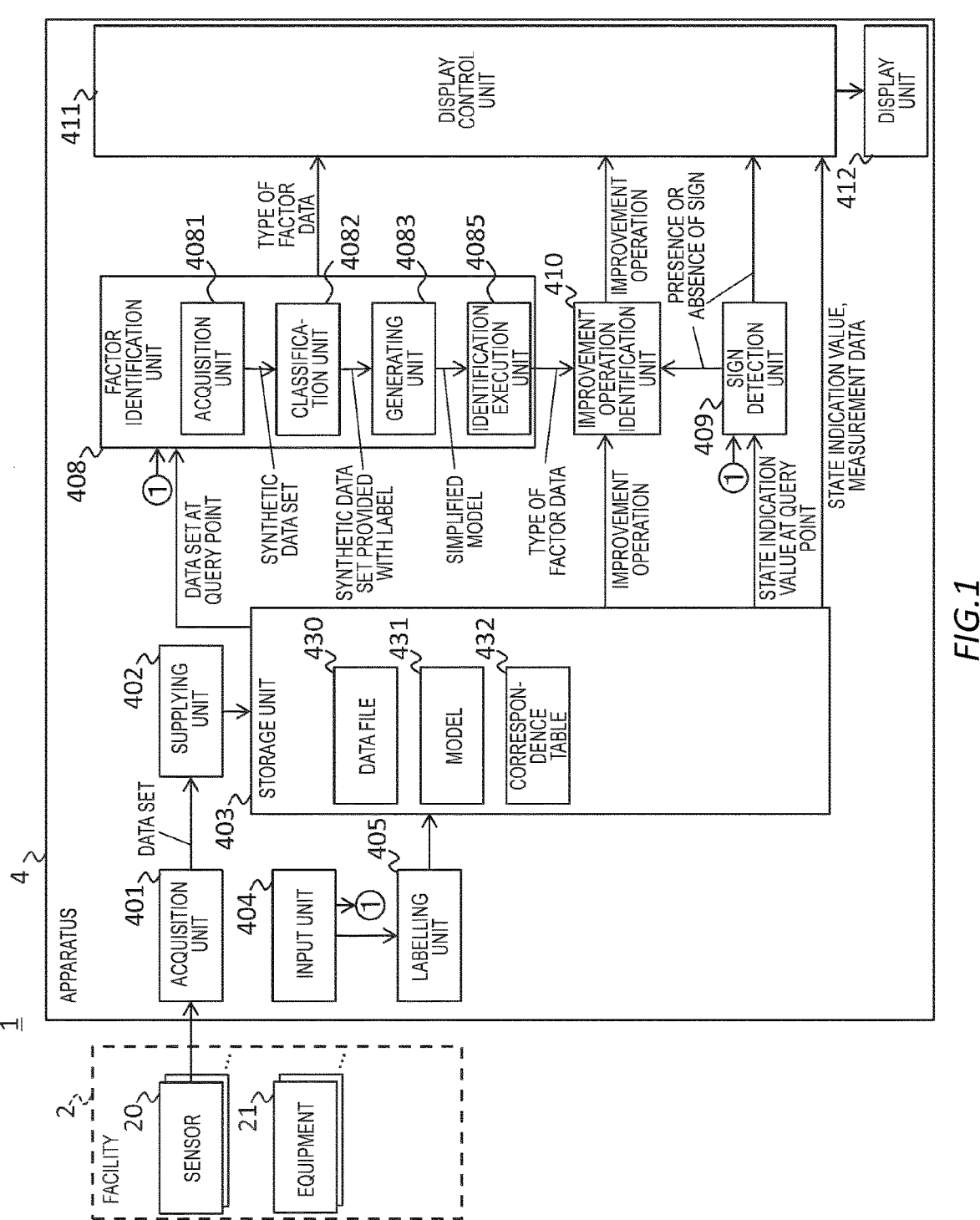
FIG. 1 illustrates a system 1 according to the first embodiment.

FIG. 1 illustrates a system 1 according to the present embodiment. The system 1 assists monitoring of a state of an object, and includes a facility 2 as an example of the object, and an apparatus 4.

1.1.1. Facility 2

The facility 2 is provided with one or more sensors 20. For example, the facility 2 may be a plant provided with a plurality of equipment 21, or may be a combined apparatus in which a plurality of equipment 21 is combined. Examples of the plant include, in addition to industrial plants such as chemical plants and bio plants, plants that manage and control well sources such as gas fields and oil fields and surroundings thereof, plants that manage and control power generation such as hydraulic power, thermal power, and nuclear power, plants that manage and control environmental power generation such as solar power and wind power, and plants that manage and control water supplies/sewage, dams, and the like.

1.1.1-1. Equipment 21

Each piece of equipment 21 is an instrument, a machine, or an apparatus, and may be, for example, an actuator such as a valve, a pump, a heater, a fan, a motor, or a switch that controls at least one physical quantity such as pressure, temperature, pH, speed, or flow rate in a process of the facility 2. Respective pieces of equipment 21 may be of different types, or at least some (two or more) pieces of equipment 21 may be of the same type. In the present embodiment, as one example, the equipment 21 is controlled from the outside in a wired or wireless manner, but may be controlled manually.

1.1.1-2. Sensor 20

Each sensor 20 measures the state of the facility 2. The sensor 20 may measure at least one physical quantity such as pressure, temperature, pH, speed, or flow rate. In addition, the sensor 20 may measure the yield of the facility 2, the proportion of impurities to be mixed, the operation status of each piece of equipment 21, and the like. Respective sensors 20 may be of different types, or at least some (two or more) of the sensors 20 may be of the same type. As one example, the plurality of sensors 20 may be a temperature sensor provided at separate locations in a furnace within the facility 2. Each sensor 20 may supply the measurement data to the apparatus 4.

It should be noted that, communication between the sensor 20 and the apparatus 4 may be performed, for example, with an ISA (International Society of Automation) wireless communication protocol, and may be performed using ISA 100, HART (Highway Addressable Remote Transducer) (registered trademark), BRAIN (registered trademark), FOUNDATION Fieldbus, PROFIBUS, or the like, as one example.

1.1.2. Apparatus 4

The apparatus 4 assists monitoring of the facility 2 using a learned model 431. The apparatus 4 includes an acquisition unit 401, a supplying unit 402, a storage unit 403, an input unit 404, a labelling unit 405, a factor identification unit 408, a sign detection unit 409, an improvement operation identification unit 410, a display control unit 411, and a display unit 412.

1.1.2-1. Acquisition Unit 401

The acquisition unit 401 is one example of a first acquisition unit, and acquires a data set including a plurality of types of measurement data indicating a state of the facility 2. The acquisition unit 401 may sequentially acquire each type of measurement data from each sensor 20. The acquisition unit 401 may acquire, as one data set, a plurality types of measurement data measured at a corresponding time point. The acquisition unit 401 may supply the acquired data set to the supplying unit 402.

It should be noted that, in the present embodiment, as one example, the type of measurement data may be different for each sensor 20, but it may be different by the physical quantity that is the object. The data set may indicate an operational point of the facility 2, and each measurement data included in the data set may be a feature value of the operational point.

1.1.2-2. Supplying Unit 402

The supplying unit 402 supplies the data set acquired by the acquisition unit 401 to the model 431. In the present embodiment, as one example, the model 431 is stored in the storage unit 403 described later, and the supplying unit 402 may supply the data set to the model 431 in the storage unit 403.

In addition, the supplying unit 402 may cause the data set to be stored in the storage unit 403. The supplying unit 402 may add, to each measurement data included in the data set, the measurement time and identification information of the sensor 20 that performed the measurement and record the same in the storage unit 403. The measurement time of the measurement data may be the time at which said measurement data was measured, and may indicate an elapsed time from the starting time of the processing executed at the facility 2. The measurement time of the measurement data may be the acquisition time of the measurement data or data set by the acquisition unit 401. It should be noted that, the measurement time and the identification information of the sensor 20 may be added in advance to the measurement data supplied from the sensor 20.

1.1.2-3. Storage Unit 403

The storage unit 403 stores a variety of information. For example, the storage unit 403 may store a data file 430, a learned model 431, and a correspondence table 432.

1.1.2-3-1. Data File 430

The data file 430 stores the data set supplied from the supplying unit 402.

1.1.2-3-2. Model 431

The model 431 outputs a state indication value indicating classification of a state of the facility 2 in response to the data set being input. It should be noted that, in the present embodiment, every time one data set is input to the model 431 and one state indication value is output from the model 431, said one state indication value may be stored in the data file 430 in association with said one data set.

In the present embodiment, as one example, the classification of the state of the facility 2 may be either one of classification indicating good (also referred to as normal) and classification indicating poor (also referred to as abnormal). The model 431 may output a state indication value (also referred to as a health index) that is not binarized with a value indicating that the facility 2 is in a good state and a value indicating a poor state. For example, the model 431 may be a model having learned using binary of a value indicating that the facility 2 is in a good state and a value indicating that the facility 2 is in a poor state, and may output the state indication value before being binarized by comparison with a threshold. In the present embodiment, as one example, when the facility 2 is in a good state (or in a nearly good state), the state indication value may be a positive value, and when the facility 2 is in a poor state (or in a nearly poor state), the state indication value may be a negative value. In addition, when the absolute value of the state indication value is small (that is, when the state indication value is close to zero), the degree of the state of the facility 2 being good or poor may be small. When the absolute value of the state indication value is large (that is, when the state indication value is far from zero), the degree of the state of the facility 2 being good or poor may be large.

The model 431 may be a support vector machine, for example, but may also be a model having learned by other algorithms such as logistic regression, decision tree, or neural network.

1.1.2-3-3. Correspondence Table 432

The correspondence table 432 stores, for each type of measurement data measured by the sensor 20, an operation for improving the measurement value of said measurement data (also referred to as an improvement operation) in association therewith. The improvement operation may be an operation of any equipment 21 in the facility 2, and may be an operation of equipment 21 that is directly related to the measurement value of the improvement object or may be an operation of equipment 21 that is not directly related. As one example, when the measurement value of the measurement data of temperature is too high, the improvement operation for improving said measurement value may be an operation to lower the output of a heater near the measurement position, may be an operation to change the opening of a valve that adjusts the flow rate of a fluid flowing in the vicinity of the measurement location, or may be an operation to change the set point of a flowmeter measuring said flow rate. The content of the correspondence table 432 may be preset through trial and error.

1.1.2-4. Input Unit 404

The input unit 404 receives an operation input from an operator. In the present embodiment, as one example, the input unit 404 may receive a selection operation at a target time point (also referred to as a query point) for investigating the state of the facility 2. The query point may be the current time point, or may be a time point in the past. The input unit 404 may supply, to the factor identification unit 408 and the sign detection unit 409, identification information (also referred to as the data set ID at the query point) of the data set measured at the query point (also referred to as a data set at the query point).

In addition, in a case where measurement data included in any of the data sets is displayed, the input unit 404 may receive an operation for providing said data set with a label indicating the quality of the state of the facility 2. The input unit 404 may supply, to the labelling unit 405, a signal indicating that the operation has been performed.

1.1.2-5. Labelling Unit 405

In response to an operation by the operator, the labelling unit 405 provides each data set with a label indicating the quality of the state of the facility 2. The labelling unit 405 may provide a corresponding data set in the storage unit 403 with a label indicating a good state or a poor state.

1.1.2-6. Factor Identification Unit 408

The factor identification unit 408 is one example of the first identification unit, and in a case where one state indication value (also referred to as the state indication value at the query point) is output from the model 431 in response to one data set (in the present embodiment, as one example, the data set at the query point) being supplied to the model 431, at least one type of measurement data (also referred to as the factor data), among the plurality of types of measurement data, having a larger influence on said one state indication value than a reference is identified. The factor data may become important data in monitoring the facility 2.

The factor identification unit 408 may perform identification of the factor data based on the data set at the query point. In the present embodiment, as one example, in response to the data set ID of the query point being supplied from the input unit 404, the factor identification unit 408 may read, from the data file 430, the corresponding data set, that is, the data set at the query point to perform identification of the factor data.

The factor identification unit 408 may use an algorithm for identifying the factor data (also referred to as an identification algorithm) to identify the factor data. The identification algorithm may be an algorithm that calculates, when one state indication value is output from the model 431 in response to one data set being supplied, the degree of influence of each type of measurement data in said one data set on said one state indication value. In addition, the identification algorithm may be an algorithm that identifies a basis for classification by the model 431.

The identification algorithm may be a model agnostic interpretable algorithm. According to a model agnostic algorithm, the factor data can be identified independent of the type of the model 431, and according to an interpretable algorithm, the factor data can be identified in a manner that is understandable by the operator. Such an identification algorithm include, for example, LIME (Local Interpretable Model-agnostic Explanations), SHAP (SHapley Additive exPlanations), or the like. SHAP may be Kernel SHAP, or may be Tree SHAP.

LIME may be an algorithm described in the following literature 1.

Literature 1: Ribeiro, et. al., "Why should I trust you? Explaining the predictions of any classifier", Proceedings of the 22nd ACM SIGKDD international conference on knowledge discovery and data mining, ACM(2016), Internet <URL:https://arxiv.org/abs/1602.04938>

SHAP may be an algorithm described in the following literature 2.

Literature 2: Lundberg et. al., "A unified approach to interpreting model predictions", Advances in Neural Information Processing Systems, 2017, Internet <URL: https://arxiv.org/abs/1705.07874>

In the present embodiment, as one example, the factor identification unit 408 may use at least LIME to identify the factor data. The factor identification unit 408 includes an acquisition unit 4081, a classification unit 4082, a generating unit 4083, and an identification execution unit 4085.

1.1.2-6 (1). Acquisition Unit 4081

The acquisition unit 4081 is one example of the second acquisition unit, and acquires a plurality of data set in closer proximity to the data set at the query point than a reference proximity degree. The acquisition unit 4081 may supply the plurality of data set acquired to the classification unit 4082.

Here, another data set in proximity to the data set at the query point may mean that the coordinate point of another data set is in proximity to the coordinate point of the data set at the query point in a coordinate space including the coordinate axis corresponding to each type of the measurement data. The reference proximity degree may be set arbitrarily by the operator.

The acquisition unit 4081 may acquire a plurality of data sets from the data file 430 of the storage unit 403. Alternatively, in the present embodiment, as one example, the acquisition unit 4081 generates a plurality of data sets (also referred to as a plurality of synthetic data sets) based on the data set at the query point. For example, the acquisition unit 4081 may generate a synthetic data set in proximity to the data set at the query point by perturbing the measurement value of at least one measurement data included in the data set at the query point. The acquisition unit 4081 may perturb the measurement value based on the probability distribution of each type of measurement data stored in the data file 430, or may perturb the measurement value randomly. The probability distribution of the measurement data may be calculated using a mixed Gaussian model.

1.1.2-6 (2). Classification Unit 4082

The classification unit 4082 uses the model 431 stored in the storage unit 403 to classify the plurality of synthetic data set acquired by the acquisition unit 4081. The classification unit 4082 may classify the plurality of synthetic data set into a first state synthetic data set corresponding to the first state (in the present embodiment, as one example, a good state), and a second state synthetic data set corresponding to the second state (in the present embodiment, as one example, a poor state). The classification unit 4082 may classify each synthetic data set based on the state indication value output after each synthetic data set is supplied to the model 431. In the present embodiment, as one example, the classification unit 4082 may classify the synthetic data set having a state indication value of zero or higher as the first state synthetic data set, and classify the synthetic data set having a negative state indication value as the second state synthetic data set.

The classification unit 4082 may provide each of the plurality of synthetic data sets with a label indicating which of the first state synthetic data set and the second state synthetic data set it has been classified to. The classification unit 4082 may supply the plurality of synthetic data sets provided with the label to the generating unit 4083.

1.1.2-6 (3). Generating Unit 4083

The generating unit 4083 generates a simplified model (also referred to as a local surrogate model) obtained by simplifying the model 431 in the region including the coordinate point of the data set at the query point. The generating unit 4083 may use the plurality of data set acquired by the acquisition unit 4081 to generate the simplified model.

Here, the region including the data set at the query point may be a region including the coordinate point of the data set at the query point in a coordinate space including a coordinate axis corresponding to each type of the measurement data. As one example, the region including the data set at the query point may be a region in closer proximity to the coordinate point of the data set at the query point than a reference proximity degree.

In addition, the simplified model may be a model for classifying the plurality of synthetic data sets in a similar manner as the model 431, and may be a model that coincides with the model 431 locally. The generating unit 4083 may generate a simplified model such that the plurality of synthetic data sets are classified in accordance with the classification indicated by the label provided by the classification unit 4082. The generating unit 4083 may generate a linear model as the simplified model. The generating unit 4083 may supply the generated simplified model 431 to the identification execution unit 4085.

1.1.2-6 (4). Identification Execution Unit 4085

The identification execution unit 4085 performs identification of at least one type of factor data based on the generated simplified model. The identification execution unit 4085 may identify, as the factor data, at least one type of measurement data, among the plurality of types of measurement data included in the data set at the query point, that is farthest from the boundary of the classification in the simplified model generate by the generating unit 4083. The identification execution unit 4085 may identify the factor data of a number specified by the operator. The identification execution unit 4085 may output the identified type of factor data to the display control unit 411. The identification execution unit 4085 may cause the identified type of factor data to be stored in the storage unit 403 in association with the data set at the query point.

The identification execution unit 4085 may calculate the representative value (as one example, an average value, a median, a mode) of each factor data when the facility 2 is in a good state. Each factor data when the facility 2 is in a good state may be a measurement value of each factor data in a data set for which a label indicating a good state has been provided by the labelling unit 405, or may be a measurement value of each factor data in a data set for which a state indication value indicating a good state has been output by the model 431. The identification execution unit 4085 may read, from the data file 430, the factor data when the facility 2 is in a good state, to calculate the representative value. The identification execution unit 4085 may supply the calculated representative value to the display control unit 411.

1.1.2-7. Sign Detection Unit 409

The sign detection unit 409 detects a sign indicating that the state of the facility 2 is becoming poor, based on transition in the state indication value. The sign detection unit 409 may read, form the data file 430, the state indication value associated with each data set within a reference time period including the time point of the corresponding query point, in response to a data set ID of the query point being supplied from the input unit 404. In addition, the sign detection unit 409 may compare the distribution of the state indication value in a reference time period including the query point with a reference distribution to detect a sign indicating that the state of the facility 2 will become poor at the time point of the query point. In the present embodiment, as one example, the sign detection unit 409 may detect that there is a sign in response to the distribution within the reference time period becoming larger than the reference distribution. It should be noted that, the query point may be the current time point, as one example, and the reference time period including the query point may be a period including the query point as its end point. The reference time period and the reference distribution may be set arbitrarily. The sign detection unit 409 may supply, to the improvement operation identification unit 410 and the display control unit 411, the detection result of the sign.

1.1.2-8. Improvement Operation Identification Unit 410

The improvement operation identification unit 410 may identify an improvement operation for improving the measurement value of the factor data that caused said sign, in response to a sign indicating that the state of the facility 2 will become poor at the time point of the query point being detected. The improvement operation identification unit 410 may consider the type of factor data identified by the factor identification unit 408 for the data set at the query point as the factor data that caused the sign. The improvement operation identification unit 410 may identify the improvement operation associated with the factor data in the correspondence table 432. The improvement operation identification unit may supply the content of the improvement operation to the display control unit 411.

1.1.2-9. Display Control Unit 411

The display control unit 411 controls the display unit 412. The display control unit 411 may cause at least the state indication value at the query point to be displayed along with the factor data at the query point. Causing the state indication value to be displayed along with the factor data may be to causing them to be displayed together. As one example, the display control unit 411 may cause the state indication value and the factor data to be displayed on a same screen of the display unit 412, or may cause them to be displayed on separate screens.

The display control unit 411 may cause only the state indication value at the time point of the query point to be displayed, or may cause the state indication values at a plurality of time points including the query point to be displayed. In a case where state indication values at a plurality of time points are caused to be displayed, the display control unit 411 may cause the transition in the state indication values output from the model 431 at the plurality of time points to be displayed. In addition, the display control unit 411 may cause a moving average or exponential moving average of the state indication value to be displayed.

In addition, the display control unit 411 may cause the type of each factor data (as one example, the type of physical quantities of the factor data, or the name, identification information, and a tag of the sensor 20 that performed the measurement of the factor data) to be displayed. In addition to the above, the display control unit 411 may read the measurement value of each factor data from the data file 430 and cause the same to be displayed. As one example, the display control unit 411 may cause the measurement value at the query point to be displayed for each factor data. The display control unit 411 may calculate, for each factor data, the moving average value of the measurement values measured at a plurality of time points including the query point (as one example, the moving average value during the reference time period including the query point) and cause the same to be displayed. In addition, the display control unit 411 may cause, for each factor data, the measurement values at a plurality of time points including the query point to be displayed, and as one example, may cause the transition in the measurement values measured at a plurality of time points to be display.

In addition, the display control unit 411 may cause the representative value of the measurement value of each factor data when the facility 2 is in a good state to be displayed together with the measurement value of the factor data. The display control unit 411 may cause, for each type of factor data, the measurement value and the representative value to be displayed in association with each other.

The display control unit 411 may further display that a sign indicating that the state of the facility 2 is becoming poor has been detected by the sign detection unit 409. For example, the display control unit 411 may cause a message indicating that a sign has been detected to be displayed.

The display control unit 411 may further cause an improvement operation for improving the factor data that caused the sign of a poor state to be displayed. In the present embodiment, as one example, the display control unit 411 may cause the content of the improvement operation identified by the improvement operation identification unit 410 to be displayed.

1.1.2-10. Display Unit 412

The display unit 412 performs display under control by the display control unit 411. It should be noted that, in the present embodiment, as one example, the display unit 412 is equipped in the apparatus 4, but may also be externally connected to the apparatus 4.

According to the apparatus 4 in the system 1 described above, in a case where one state indication value, that is, the state indication value at the query point, is output from the model 431 in response to the data set at the query point being supplied, the type of factor data, among the plurality of types of measurement data, having a larger influence on the state indication value at the query point than a reference is identified based on the data set at the query point, and the state indication value is displayed along with the identified type of factor data. Therefore, it is possible to collectively confirm the state indication value of the facility 2 and the type of factor data that is the basis thereof.

In addition, a simplified model, that is, a local surrogate model, obtained by simplifying the model 431 in the region including the coordinate point of the data set at the query point is generated, and identification is performed based on said simplified model. Therefore, the measurement data that had an influence on the state indication value is identified in a manner that is understandable by the operator.

In addition, the simplified model is generated using a plurality of data sets in closer proximity to the data set at the query point than a reference proximity degree. Therefore, a simplified model with high classification accuracy can be generated in a local region in the vicinity of the data set at the query point.

In addition, since the representative value of the measurement value of each factor data when the facility 2 is in a good state is displayed together with the measurement value of the factor data at the query point, it is possible to immediately grasp the degree of deviation of the measurement value of the factor data at the query point from the representative value.

In addition, since factor data of a number specified by the operator is identified, in a case of a poor state, it is possible to reliably grasp the factor data by presetting the number of the factor data that can be grasped by the operator.

In addition, since the model 431 outputs a state indication value that is not binarized with a value indicating that the facility 2 is in a good state and a value indicating a poor state, it is possible to grasp the degree of the state being good or poor.

In addition, since the sign indicating that the state of the facility 2 is becoming poor is detected and displayed based on transition in the state indication value, it is possible to grasp in advance that the state is becoming poor.

In addition, since the sign is detected in response to the distribution in the state indication value within the reference time period becoming greater than the reference distribution, it is possible to detect the sign in response to the state indication value varying and fluctuating.

In addition, in a case where, for each type of measurement data, an operation for improving the measurement value of said measurement data is stored in association therewith, and the sign indicating that the state of the facility 2 is becoming poor is detected, the operation associated with the type of factor data that caused the sign is displayed. Therefore, it is possible to immediately grasp and execute the operation for improving the state.

1.2. Operation

Figure 2:
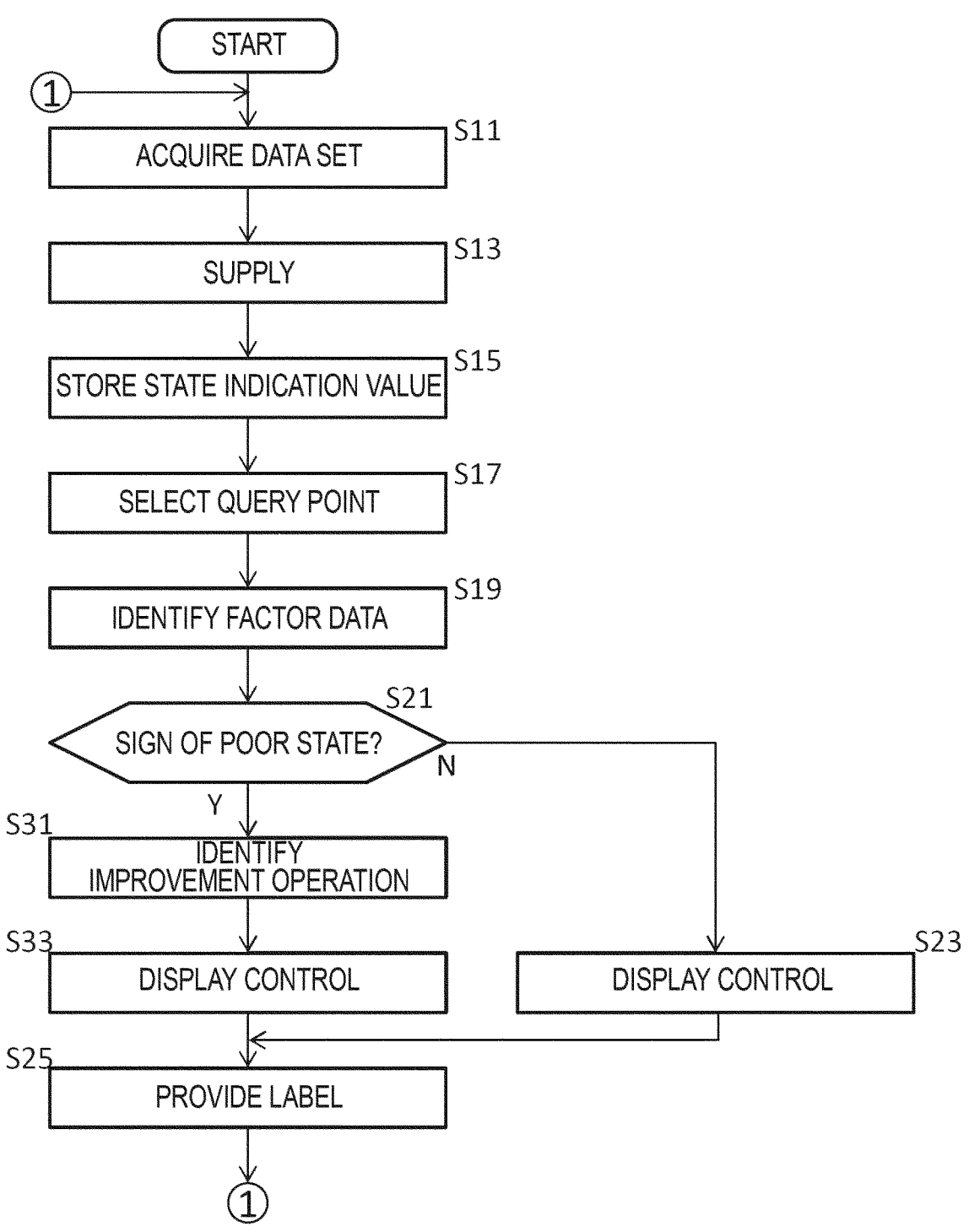
FIG. 2 illustrates an operation of an apparatus 4.

FIG. 2 illustrates an operation of an apparatus 4. The apparatus 4 assists monitoring of the facility 2 by the processing of steps S11 to S33. It should be noted that, this operation may start in response to activation of the facility 2. In addition, at the starting point of the operation, the model 431 may be stored in the storage unit 403.

At step S11, the acquisition unit 401 acquires a data set indicating the state of the facility 2. The acquisition unit 401 may acquire a measurement data set measured at the current time point. At step S13, the supplying unit 402 supplies the acquired data set to the model 431. In this manner, at step S15, a state indication value according to the state indicated by the data set is output from the model 431, and stored in the data file 430.

At step S17, the input unit 404 selects any of the current time point or a past time point as the query point. The input unit 404 may select the current time point as the query point in a case where an operation is not performed by the operator. Alternatively, the input unit 404 may select, as a new query point, the query point selected in the processing of step S17 previously, or a time point immediately after the query point selected in the processing of step S17 previously.

At step S19, the factor identification unit 408 identifies at least one type of factor data having a larger influence on the state indication value at the query point than a reference, among the measurement data included in the data set at the query point. The factor identification unit 408 may identify at least one type of factor data by each of a plurality of identification algorithms (as one example, LIME, SHAP, or the like). In addition, the factor identification unit 408 may calculate, for each factor data identified, the representative value (as one example, the average value, the median, the mode) when the facility 2 is in a good state.

In addition, the factor identification unit 408 may calculate a performance indication value for each of the plurality of identification algorithms. At least one of fidelity or stability degree described in the following literature 3 can be used as the performance indication value of the identification algorithm. The fidelity degree is an indication of reproduction of the original model 431 by the identification algorithm, and is preferably higher. The stability degree is a value indicating the degree of variation in the output in a case where the input to the identification algorithm is changed, and is preferably lower.

Literature 3: Francesco Bodria et. al., "Benchmarking and Survey of Explanation Methods for Black Box Models", Internet <URL:https://arxiv.org/abs/2102.13076>

In addition, the factor identification unit 408 may calculate the degree of influence (also referred to as contributory degree, contribution, importance) of the type of factor data identified by each algorithm on the state indication value at the query point, in a case where the factor data is identified using a plurality of identification algorithms. A score of the degree of influence calculated for each factor data in the identification algorithm may be used as the degree of influence of the factor data on the state indication value.

At step S21, the sign detection unit 409 of the apparatus 4 attempts to detect a sign indicating that the state of the facility 2 is becoming poor based on the transition in the state indication value up to a time point of the query point, to determine whether the sign has been detected. In a case where it is determined that the sign has been detected (step S21: Yes), the processing may proceed to step S31. In a case where it is determined that the sign is not detected (step S21: No), the processing may proceed to step S23.

At step S23, the display control unit 411 causes the state indication value at the query point along with the factor data corresponding to said state indication value to be displayed on the display unit 412. In a case where the factor is identified by the factor identification unit 408 with each of the plurality of identification algorithms, the display control unit 411 may cause the identified type of factor data to be display for each identification algorithm used by the factor identification unit 408. In addition, in a case where performance indication value of each identification algorithm is calculated by the factor identification unit 408, the display control unit 411 may cause the performance indication value of said identification algorithm to be displayed for each identification algorithm. In addition, in a case where the degree of influence on the state indication value is calculated for each factor data by the factor identification unit 408, the display control unit 411 may normalize such degree of influence to display the same.

In addition, the display control unit 411 may cause the representative value of the measurement value of each factor data when the facility 2 is in a good state to be displayed together with the measurement value of the factor data. In addition, the display control unit 411 may cause, for each factor data, the representative value thereof and the measurement value at the time point of the query point to be displayed as a graph. The graph may be a bar chart, or may be a radar chart. The display control unit 411 may cause a scale indicating a reference divergence degree from the representative value to be displayed in the graph. The reference divergence may be 1σ, 2σ, or 3σ when the distribution of measurement value in the measurement data is considered to be a normal distribution. σ may be a standard deviation of the measurement value.

At step S25, the labelling unit 405 provides each measurement data measured at a time point specified by the operator with a label. The specified time point may be the time point of the query point, or may be other time points corresponding to the factor data or the state indication value that is displayed. In addition, the specified time point may be one point in time, or may be a plurality of points in time that are consecutive or inconsecutive.

For example, in a case where any of the factor data or state indication value that is displayed is specified by the operator via the input unit 404, the labelling unit 405 may identify, as the specified time point, the measurement time of the factor data that is the specified object or the measurement time of the factor data corresponding to the state indication value that is the specified object. The labelling unit 405 may provide the data set in the storage unit 403 measured at the identified measurement time with the label.

In response to an operation indicating a good state being performed on the input unit 404, the labelling unit 405 may provide the data set with a label indicating the same. Similarly, in response to an operation indication a poor state being performed on the input unit 404, the labelling unit 405 may provide the data set with a label indicating the same. When the processing of step S25 is ended, the processing may proceed to step S11.

At step S31, the improvement operation identification unit 410 identifies an improvement operation for improving the measurement value of the factor data that caused the poor state. The improvement operation identification unit 410 may identify the improvement operation associated with the factor data in the correspondence table 432.

At step S33, the display control unit 411 causes the state indication value output from the model 431 to be displayed along with the factor data on the display unit 412, in a similar manner as the processing of step S23.

In the processing of step S33, however, the display control unit 411 may further cause a message indicating that a sign of a poor state has been detected to be displayed. In addition, the display control unit 411 may further cause the improvement operation for improving the factor data to be displayed. When the processing of step S33 is ended, the processing may proceed to step S25.

According to the above operation, since the identified type of factor data is displayed for each identification algorithm that identifies the basis of classification by the model 431, it is possible to reliably confirm the factor data that had an influence on the state indication value by considering common factor data, among the factor data identified by separate identification algorithms. In addition, it is possible to confirm the factor data that had an influence on the state indication value in a multidirectional manner, by considering factor data that are not common among the factor data identified by the identification algorithm.

In addition, since, for each identification algorithm, the performance indication value (as one example, the fidelity or stability degree) thereof is displayed, it is possible to compare the performance of the identification algorithms. Therefore, it is possible to focus on confirming the factor data identified by the identification algorithm with high performance.

In addition, the degree of influence of the type of factor data identified by each identification algorithm on the state indication value is normalized and displayed. Therefore, it is possible to compare the degree of influence between a plurality of types of factor data identified by separate identification algorithms.

In addition, since the representative value when the facility 2 is in a good state and the measurement value at the time point of the query point is displayed for each factor data as a graph, it is possible to easily grasp the degree of deviation of the measurement value of the factor data from the representative value.

In addition, since a scale indicating the reference divergence from the representative value is displayed in the graph, it is possible to further easily grasp the degree of deviation of the measurement value of the factor data at the query point from the representative value.

In addition, since the data set is provided with a label indicating the quality of the state of the object, the data set provided with the label can be used to execute learning of the model 431. In addition, since each data set measured at a time point specified by the operator is provided with a label, provision of the label can be easily performed.

1.3. Operation Example

Figure 3:
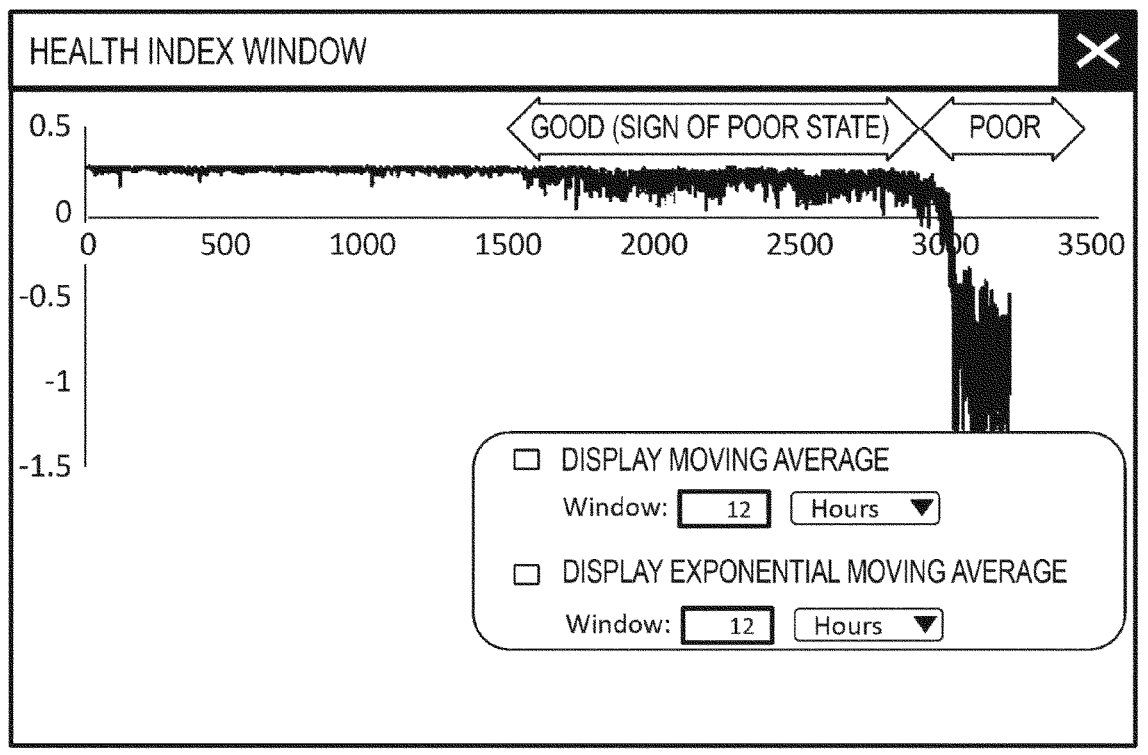
FIG. 3 illustrates an example of the transition in the state indication value.

FIG. 3 illustrates an example of the transition in the state indication value. In the figure, the horizontal axis represents the time, and the vertical axis represents the state indication value. As shown in this figure, it is detected that there is a sign of a poor state as the distribution in the state indication value becomes larger. In this way, it is possible to grasp in advance that the state is becoming poor.

It should be noted that, a checkbox for displaying the state indication value by a moving average or exponential moving average may be displayed on the display screen, and the display content may be updated according to the presence or absence of a check mark in the checkbox. In addition, an entry field for inputting the length of the window of time of the moving average or the exponential moving average may be displayed on the display screen, and the display content may be updated according to the length of the window of time that is input.

Figure 4:
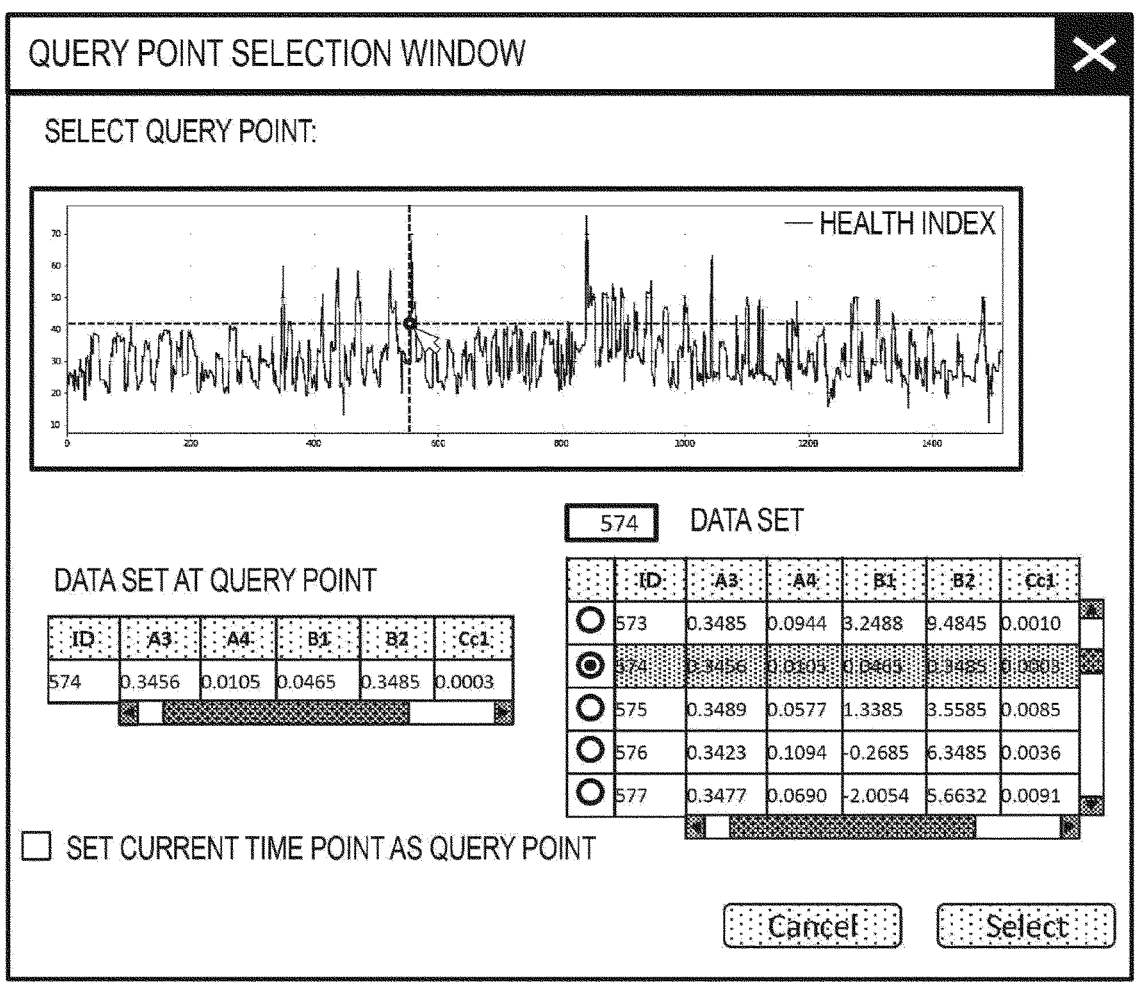
FIG. 4 illustrates an example of a selection screen of a query point.

FIG. 4 illustrates an example of a selection screen of the query point. When an operation of selecting a query point is input via the input unit 404, at step S17, a selection screen of the query point may be displayed on the display screen of the display unit 412.

A graph (see the upper portion in the figure) indicating the transition in the state indication value may be displayed in the selection screen of the query point. When a state indication value at any time point is selected on this graph with a cursor, the selected time point may be selected as the query point.

In addition, a table (see the bottom right portion in the figure) indicating the data set for each measurement time point may be displayed in the selection screen of the query point. The data set for each measurement time point may be displayed in association with the data set ID in each row of this table. When any of the rows is selected in the table, the measurement time point corresponding to the row may be selected as the query point. It should be noted that, in the present drawing, as one example, the row number is used as the data set ID, but the measurement time point (also referred to as a time stamp) of the measurement data included in the data set may be used.

In addition, the checkbox for selecting the current time point as the query point, or the content of the data set corresponding to the query point selected at the current time point may be further displayed in the selection screen of the query point.

Figure 5:
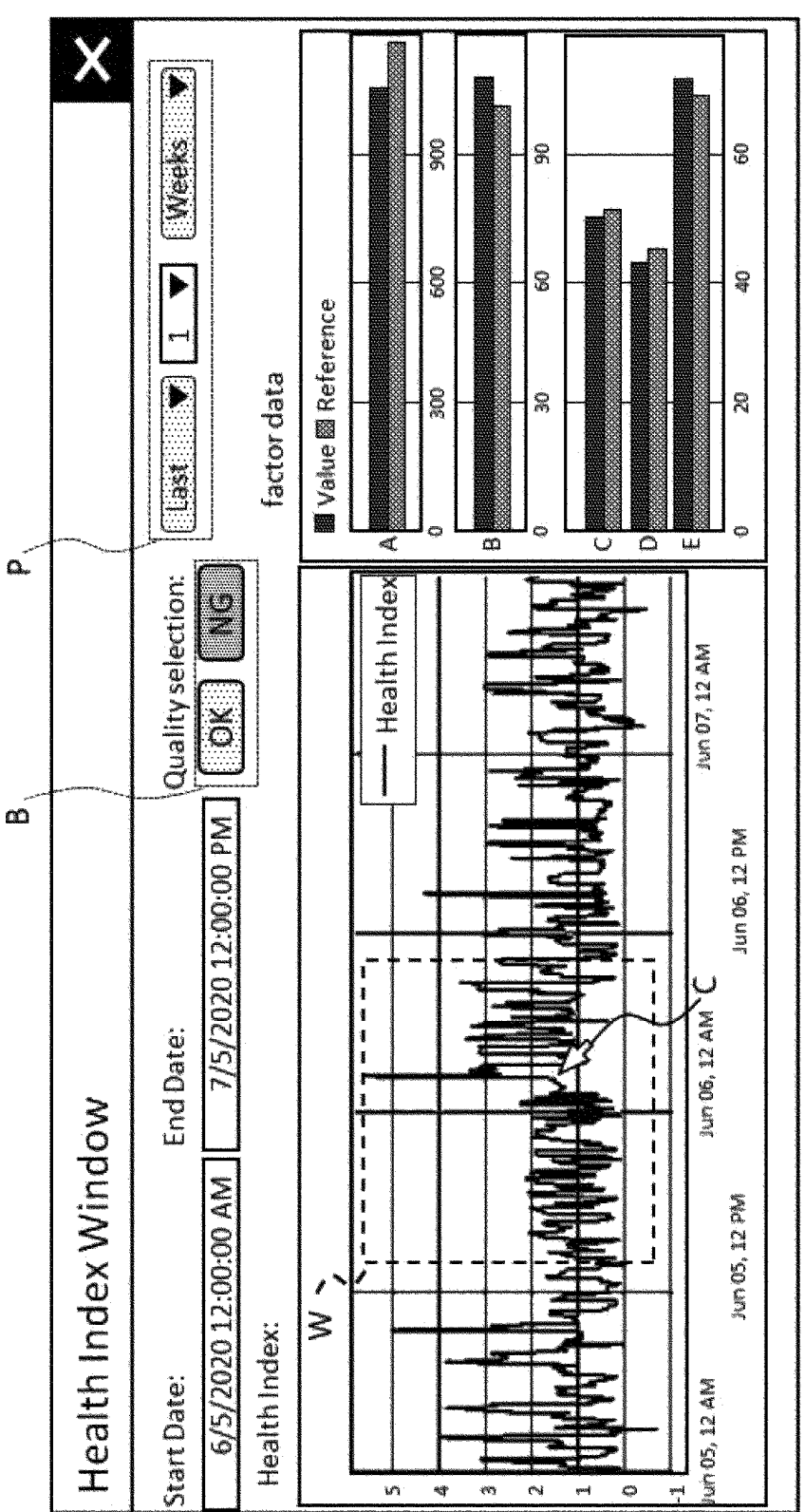
FIG. 5 illustrates an example of a display screen.

FIG. 5 illustrates an example of the display screen. At step S23 and S33, the transition in the state indication value and the plurality of factor data at the query point may be displayed on the display screen of the display unit 412. In the present drawing, as one example, the transition in the state indication value, that is, the health index is displayed on the left side of the display screen, and the query point is selected by the cursor C. In addition, the measurement value of each of the factor data "A" to "E" at the query point and the representative value when the facility 2 is in a good state are displayed on the right side of the display screen as a bar chart arranged vertically.

In addition, a pull-down menu P for selecting the display period of the state indication value may be displayed on the display screen. When any period is selected by selection of the pull-down menu P, the state indication value during the period may be displayed. It should be noted that, in the present drawing, as one example, "Last" meaning the most recent period is selected in the pull-down menu P, and the state indication value during the most recent period is displayed.

In addition, a quality button B for selecting the type of a label to be provided to the measurement data may be displayed on the display screen. The quality button B may include a "OK" button and an "NG" button, and when the "OK" button and the "NG" button are operated, each of the latest measurement data may be provided with a label indicating that the state of the facility 2 is good or poor.

In addition, a grid line W specifying any period within the display period may be displayed on the display screen in response to the operation by the operator. The grid line W may specify the range of at least part of the transition in the state indication value or factor data at a plurality of time points. Each measurement data measured within a period specified with the grid line W may be provided with a label by the labelling unit 405 in response to the operation of the quality button B.

Figure 6:
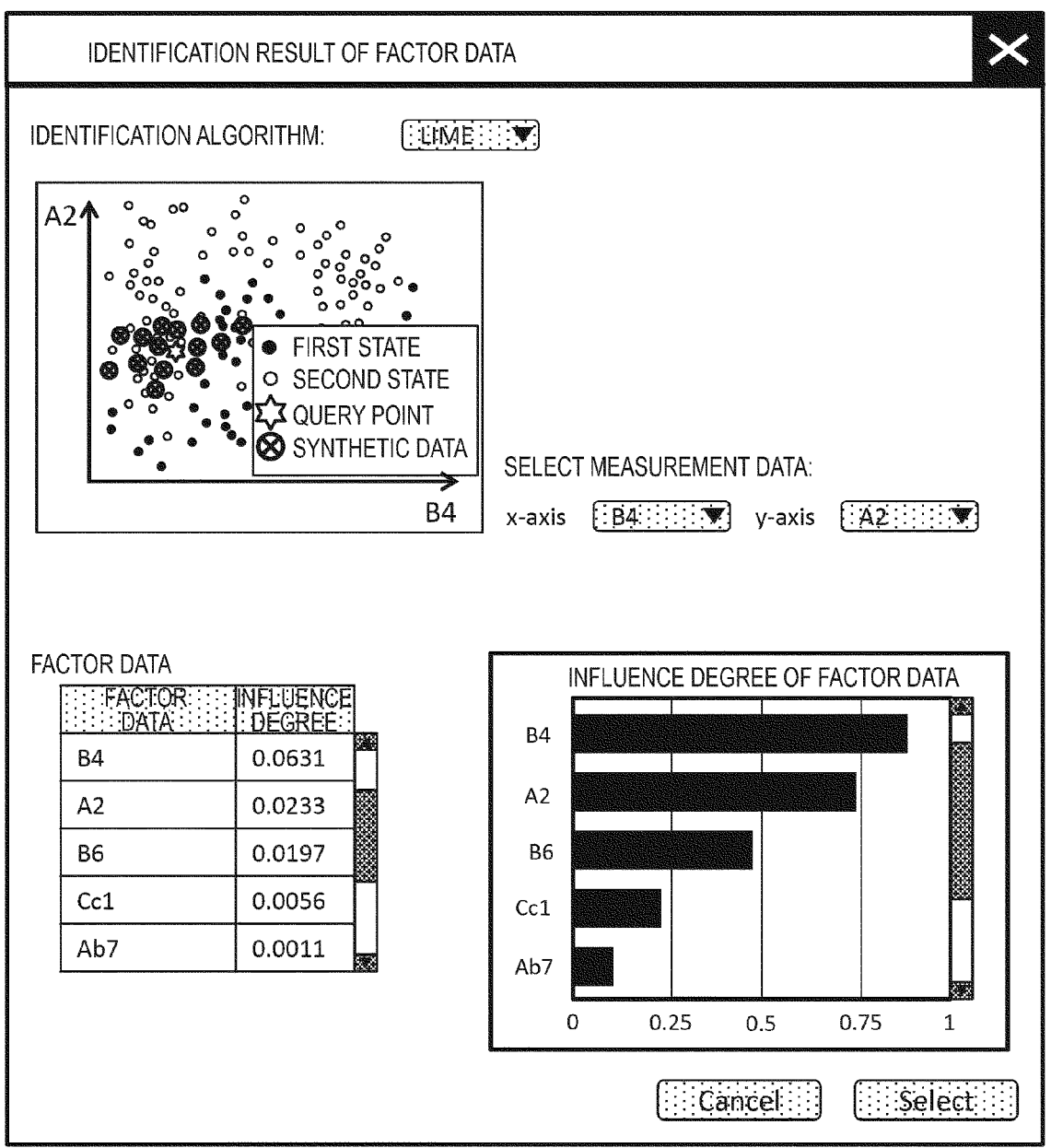
FIG. 6 illustrates another display example of factor data.

FIG. 6 illustrates another display example of the factor data. At step S23 or S33, in association with each factor data, the degree of influence of said factor data may be displayed on the display screen of the display unit 412. The degree of influence may be displayed as a numerical value (see the bottom left portion in the figure), or may be displayed as a graph such as a bar chart or a pie chart (see the bottom right portion in the figure). Each factor data may be displayed in the order of the degree of influence in a decreasing manner.

In addition, on the display screen of the factor data, a scatter diagram of each data set and the data set at the query point may be displayed in a coordinate space including the factor data as the coordinate axis (see the upper portion in the figure). Each data set in the scatter diagram may be displayed to be able to identify which of the first state and the second state it corresponds to. In a case where a synthetic data set is generated by the acquisition unit 4081 when identifying the factor data, the synthetic data set may further be displayed in the scatter diagram. The type of the factor data used for the coordinate axis may be changed via the input unit 404.

In addition, the type of the identification algorithm used by the factor identification unit 408 may be displayed on the display screen of the factor data. The type of the identification algorithm used may be changed via the input unit 404. In a case where the identification algorithm is changed, the factor data may be identified again and the content of the display screen may be updated.

Figure 7:
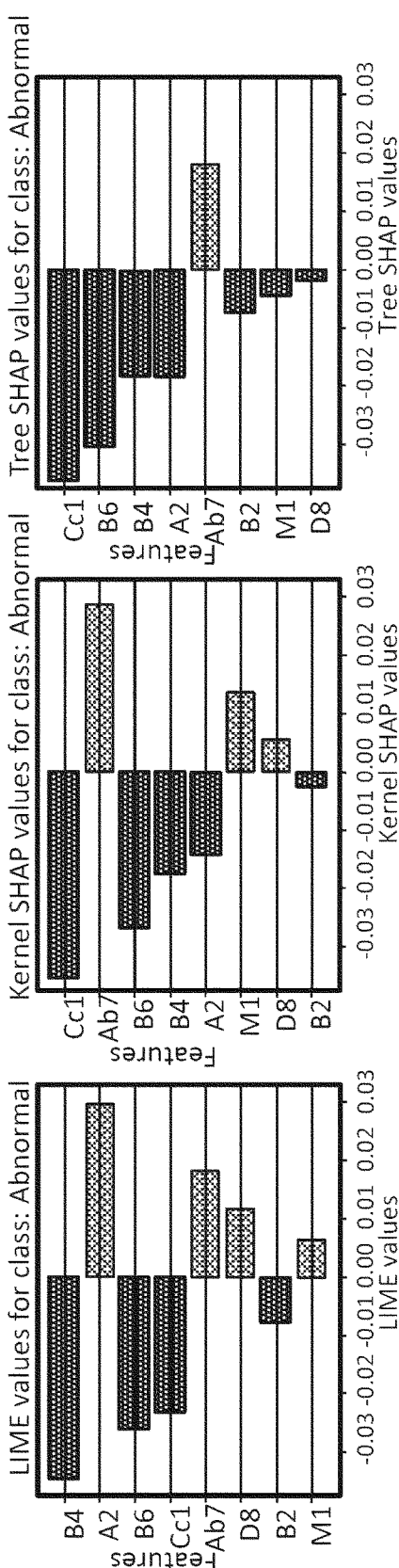
FIG. 7 illustrates another display example of factor data.

FIG. 7 illustrates another display example of the factor data. In a case where a plurality of identification algorithms was used by the factor identification unit 408, at step S23 and S33, the identified type of factor data may be displayed on the display screen of the display unit 412 for each identification algorithm. In addition, the degree of influence of each factor data may be normalized and displayed in a graph such as a bar chart. In the present drawing, as one example, each degree of influence is normalized to a range of $-1$ to $1$.

Figure 8:
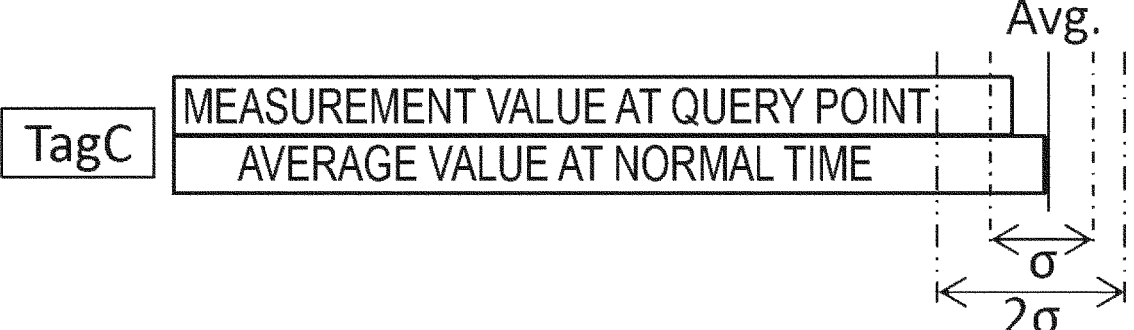
FIG. 8 illustrates another display example of factor data.

FIG. 8 illustrates another display example of the factor data. A scale indicating the reference divergence degree from the representative value may be displayed in the graph of the factor data together with the measurement value of the factor data at the query point. In the present drawing, as one example, a scale indicating a section that is apart from the average value by $\sigma$, $2\sigma$ is displayed.

Figure 9:
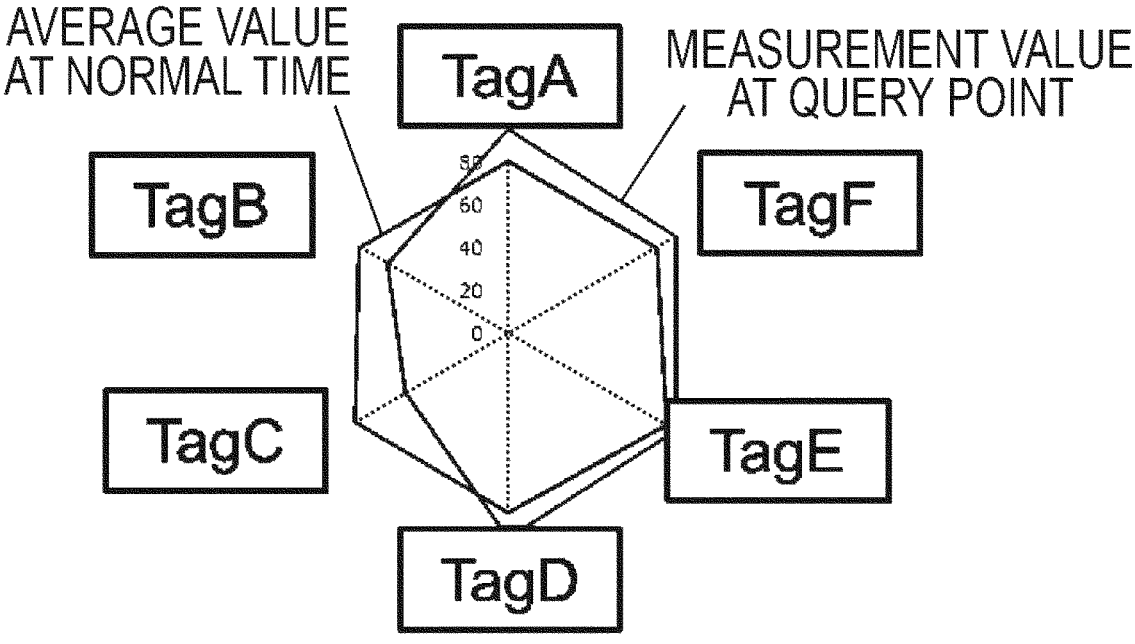
FIG. 9 illustrates another display example of factor data.

FIG. 9 illustrates another display example of the factor data. The representative value of the factor data and the measurement value at the query point may be displayed as a graph in the form of a radar chart.

2. Second Embodiment

2.1. Configuration of System 1A

Figure 10:
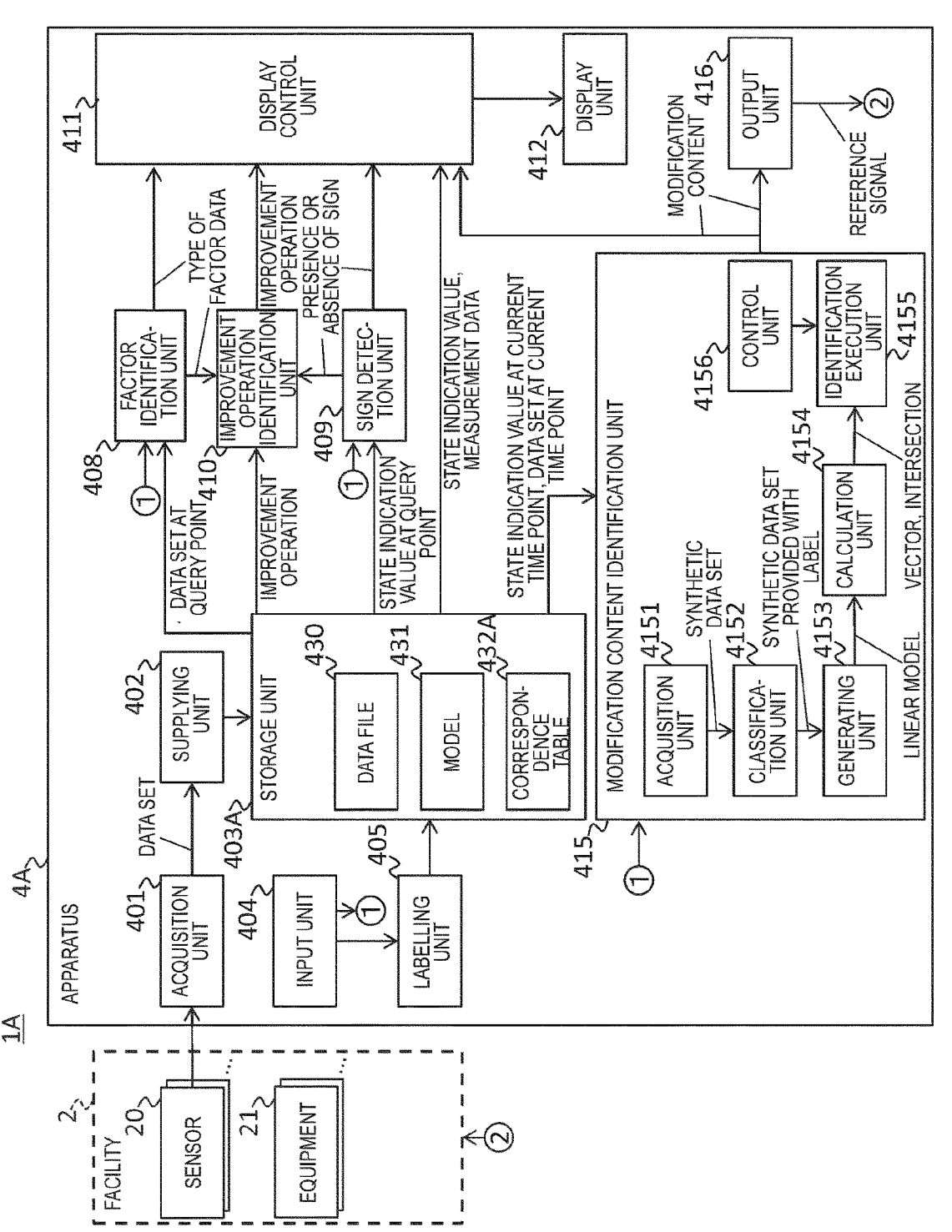
FIG. 10 illustrates a system 1A according to the second embodiment.

FIG. 10 illustrates a system 1A according to the present embodiment. It should be noted that, in the system 1A according to the present embodiment, substantially the same components as those of the system 1 illustrated in FIG. 1 are denoted by the same reference numerals, and the description thereof will be omitted.

The system 1A includes a facility 2 and an apparatus 4A as one example of the object, and the apparatus 4A includes a storage unit 403A, a modification content identification unit 415, and an output unit 416.

2.1.2-1. Storage Unit 403A

The storage unit 403A stores a correspondence table 432A. In addition to the stored content of the correspondence table 432 in the storage unit 403, the correspondence table 432A may store, for each range or value of the measurement value of each measurement data, a content of operation data for setting the measurement value of said measurement data to be within said range or to said value in association therewith. The operation data may indicate the content of operation on any equipment 21 in the facility 2. The content of the correspondence table 432A may be preset through trial and error.

2.1.2-2. Modification Content Identification Unit 415

The modification content identification unit 415 is one example of the second identification unit, and identifies, in a case where it is indicated by the state indication value at the query point (in the present embodiment, as one example, the current time point) that the facility 2 is in the first state (in the present embodiment, as one example, an abnormal state), the modification content recommended to change the state of the facility 2 from the first state to the second state (in the present embodiment, as one example, a normal state that is different from the first state). The modification content identification unit 415 may acquire the state indication value at the current time point from the model 431, and identify the modification content in response to said state indication value indicating that the facility 2 is in the first state. The modification content identification unit 415 may perform identification of the modification content based on the measurement data at the query point. The modification content identification unit 415 may read the data set at the query point from the data file 430 to perform identification of the modification content.

The modification content identification unit 415 may identify the recommended modification content for the selected data (also referred to as modifiable data) selected from among the plurality types of measurement data included in the data set and one or more operation data indicating operations on the facility 2. The modification content identification unit 415 may receive an operation of selecting the modifiable data via the input unit 404. In addition, the modification content identification unit 415 may further receive an operation of setting tolerance for at least one modifiable data via the input unit 404. The tolerance of the modifiable data may include at least one of an upper limit value or a lower limit value.

The modification content identification unit 415 may identify the modification content for each modifiable data selected. In a case where the tolerance is set for the modifiable data, the modification content identification unit 415 may identify the modification content within the set tolerance. In addition, the modification content identification unit 415 may identify, as the modification content, the range or value recommended for the modifiable data. The modification content identification unit 415 includes an acquisition unit 4151, a classification unit 4152, a generating unit 4153, a calculation unit 4154, an identification execution unit 4155, and a control unit 4156.

2.1.2-2 (1). Acquisition Unit 4151

The acquisition unit 4151 is one example of the third acquisition unit, and acquires a plurality of data sets in closer proximity to the data set at the query point (in the present embodiment, as one example, the current time point) than a reference approximation degree. The acquisition unit 4151 may acquire a plurality of data sets in a manner similar to the acquisition unit 4081 of the factor identification unit 408. However, in a case where a plurality of synthetic data sets are generated, the acquisition unit 4151 may generate the synthetic data set in proximity to the data set at the query point by perturbing the measurement value of at least one modifiable data included in the data set at the query point. The reference proximity degree for the acquisition unit 4081 may be the same as the reference proximity degree for the acquisition unit 4151, or may be different. In a case where tolerance is set for the modifiable data, the acquisition unit 4151 may perturb the measurement value at a reference proximity degree according to said tolerance. The acquisition unit 4151 may supply, to the classification unit 4152, the plurality of synthetic data sets acquired.

2.1.2-2(2). Classification Unit 4152

The classification unit 4152 uses the model 431 to classify the plurality of synthetic data sets acquired by the acquisition unit 4151 into a first state synthetic data set corresponding to the first state (in the present embodiment, as one example, an abnormal state) indicated by the state indication value at the query point and a second state synthetic data set corresponding to a second state (in the present embodiment, as one example, a normal state). The classification unit 4152 may classify the plurality of synthetic data sets in a similar manner as the classification unit 4082 of the factor identification unit 408, in response to acquiring the measurement data set at the query point (in the present embodiment, as one example, the current time point) from the storage unit 403.

The classification unit 4152 may provide each of the plurality of synthetic data sets with a label indicating which of the first state synthetic data set and the second state synthetic data set it has been classified to. The classification unit 4152 may supply the plurality of synthetic data sets provided with the label to the generating unit 4153.

2.1.2-2(3). Generating Unit 4153

The generating unit 4153 generates a linear model for classifying the plurality of synthetic data sets into either of the first state synthetic data set and the second state synthetic data set, based on the classification result by the classification unit 4152. The linear model may be a simplified model (also referred to as a local surrogate model) obtained by simplifying the model 431 in the region including the data set at the query point (in the present embodiment, as one example, the current time point). The generating unit 4153 may use the plurality of synthetic data sets acquired by the acquisition unit 4151 to generate the linear model. The generating unit 4153 may generate the linear model in a similar manner as the generating unit 4083 of the factor identification unit 408 generating the simplified model. The generating unit 4153 may supply the generated linear model to the calculation unit 4154.

2.1.2-2 (4). Calculation Unit 4154

The calculation unit 4154 calculates a vector (also referred to as a difference vector) from the coordinate point of the data set at the query point to the coordinate point of the centroid of the plurality of second state synthetic data sets. In the present embodiment, as one example, the calculation unit 4154 calculates a difference vector from the coordinate point of the data set at the current time point for which it was indicated by the state indication value that the facility 2 is in an abnormal state to the coordinate point of the centroid of the plurality of second state synthetic data sets corresponding to a normal state. The calculation unit 4154 may calculate the difference vector by defining, as the coordinate point of the centroid, the average coordinate point of the plurality of second state synthetic data sets, among the plurality of synthetic data sets acquired by the acquisition unit 4151.

Here, the centroid of the plurality of second state synthetic data sets may indicate a data set that is in proximity to the data set at the query point (in the present embodiment, as one example, the current time point) corresponding to the first state, and that corresponds to the second state. Therefore, the positive or negative sign of each component in the difference vector may indicate a direction of changing, that is, direction of increasing or decreasing each measurement data, when the state of the facility 2 is transitioned from a coordinate point of the first state (in the present embodiment, as one example, an abnormal state) corresponding to the data set at the query point to a coordinate point of the second state (in the present embodiment, as one example, a normal state) in proximity. In addition, the value of each component of the difference vector may indicate the amount by which each measurement data is to be changed in a case where the state of the facility 2 is to be transitioned. Therefore, among each component of the difference vector, for example, in a case where the component corresponding to the first measurement data is "−2", it may be indicated by the difference vector to change the first measurement data by −2.

In addition, the calculation unit 4154 may further calculate the intersection between the difference vector and the linear model generated by the generating unit 4153. The intersection between the difference vector and the linear model may be an intersection between a straight line that connects the coordinate point of the data set at the query point and the coordinate point of the centroid of the plurality of second state synthetic data sets, and a function that corresponds to the linear model. The calculation unit 4154 may supply the difference vector and the coordinates of the intersection to the identification execution unit 4155.

2.1.2-2 (5). Identification Execution Unit 4155

The identification execution unit 4155 is one example of the second identification execution unit, and identifies the modification content recommended for the modifiable data based on the calculation results by the calculation unit 4154.

The identification execution unit 4155 may identify a recommended modification content based on the difference vector and the intersection calculated by the calculation unit 4154. For example, the identification execution unit 4155 may identify a recommended range of each measurement data by considering the coordinate of the intersection as the reference and the sign of each component of the difference vector as the direction of change of the measurement data. As one example, description will be made for a case where the data set includes three types of measurement data (F1, F2, F3), and the coordinate x of the intersection and the difference vector d are represented by x=(x1, x2, x3), d=(+d1, −d2, +d3), where d1 to d3 are positive values. In this case, the identification execution unit 4155 may define the recommended range for the measurement data F1 as a range that is larger than x1, that is, F1>x1. Similarly, the identification execution unit 4155 may define the recommended range for the measurement data F2, F3 as F2<x2, F3>x3.

In addition, the identification execution unit 4155 may identify the recommended modification content based on the difference vector calculated by the calculation unit 4154. For example, the identification execution unit 4155 may identify the recommended range of each measurement data by considering the sign of each component of the difference vector as the direction of change of the measurement data. As one example, description will be made for a case where the data set includes three types of measurement data (F1, F2, F3), and the difference vector d is represented by d=(+d1, −d2, +d3). In this case, the identification execution unit 4155 may take, as the recommended range for the measurement data F1, F3, a range where the measurement data F1, F3 becomes larger than the measurement value at the query point, and may take, as the recommended range for the measurement data F2, a range where the measurement data F2 becomes smaller than the measurement value at the query point.

In addition, the identification execution unit 4155 may identify the recommended modification content based on the intersection calculated by the calculation unit 4154 or the centroid of the plurality of second state synthetic data sets. For example, the identification execution unit 4155 may identify the coordinate of the intersection or the centroid as the recommended value. As one example, in a case where the data set includes three types of measurement data (F1, F2, F3) and the coordinate x of the intersection or the centroid is represented by x=(x1, x2, x3), the identification execution unit 4155 may define the recommended value of the measurement data (F1, F2, F3) as (x1, x2, x3).

In a case where measurement data is selected as the modifiable data, the identification execution unit 4155 may identify, as the recommended modification content, the recommended range or recommended value of the measurement data. In a case where operation data is selected as the modifiable data, the identification execution unit 4155 may identify the recommended range or recommended value of the measurement data of any type, and may identify, as the recommended modification content, operation contents associated with said recommended range or recommended value in the correspondence table 432A. As one example, the identification execution unit 4155 may detect the type of the measurement data associated with the modifiable data (here, the operation data) in the correspondence table 432A, and may identify, as the recommended modification content, the operation contents of the modifiable data associated with the recommended range or recommended value of said measurement data in the correspondence table 432A.

The identification execution unit 4155 may supply the recommended modification content to at least one of the display control unit 411 or the output unit 416. In a case where the modification content is supplied to the display control unit 411, said modification content may be displayed on the display unit 412 by the display control unit 411. In this case, equipment 21 of the facility 2 may be operated manually by the operator. In a case where the modification content is supplied to the output unit 416, the facility 2 may be automatically operated according to said modification content.

It should be noted that, in a case where modification content for any of the modifiable data is already realized at the query point, the identification execution unit 4155 may not include the modification content for said modifiable data in the modification content supplied to the display unit 412 or the output unit 416. In a case where a plurality of modifiable data is selected, the control unit 4156 may supply the modification content for the modifiable data of a reference number in order of the modification content being closer to the actual value at the query point, among said plurality of modifiable data. Alternatively, in a case where a plurality of modifiable data is selected, the control unit 4156 may supply the modification content for the modifiable data of a reference number in order of the modification content being far from the actual value at the query point, among said plurality of modifiable data. The reference number may be arbitrarily set in advance.

2.1.2-2 (6). Control Unit 4156

The control unit 4156 controls each unit of the modification content identification unit 415.

For example, the control unit 4156 may disable the identification execution unit 4155 in response to the distance between the coordinate point of the data set at the query point and the boundary of classification by the model 431 being larger than a reference distance. Additionally, or alternatively, the control unit 4156 may disable the identification execution unit 4155 in response to the number of synthetic data sets classified as the second state data set by the classification unit 4152, among the plurality of synthetic data sets being less than a reference number.

In this manner, in a case where second state synthetic data sets are not acquired sufficiently and the accuracy of the centroid of the second state synthetic data sets becomes low, or in a case where the local consistency between the linear model and the model 431 becomes low, the identification execution unit 4155 is disabled. Therefore, in a case where the accuracy of the recommended modification content becomes low, identification of the modification content is prevented.

It should be noted that, the boundary of classification by the model 431 may be a boundary for classifying the plurality of synthetic data sets acquired by the acquisition unit 4151 into first state synthetic data sets and second state synthetic data sets. The boundary of classification by the model 431 may be a boundary for a local classification within a region of a reference proximity degree from the coordinate point of the data set at the query point. The boundary of classification by the model 431 may be acquired by a conventionally known technique. The reference distance and the reference number may be set arbitrarily.

The control unit 4156 may disable the identification execution unit 4155 by any technique. For example, the control unit 4156 may stop the identification execution unit 4155 itself, or may stop data supply from the calculation unit 4154 to the identification execution unit 4155.

In a case the second identification execution unit 4155 is disabled, the control unit 4156 may cause an error message to be displayed on the display unit 412 via the display control unit 411. In addition, in a case where the second identification execution unit 4155 is disabled, the control unit 4156 may cause the coordinate of the centroid of the second state synthetic data sets calculated by the calculation unit 4154 to be displayed. In this case, the facility 2 may be operated manually by the operator by referring to the coordinate of the centroid that is displayed.

2.1.2-3. Output Unit 416

The output unit 416 outputs a control signal indicating the recommended modification content (also referred to as a reference signal, target signal) for to a control apparatus (not illustrated) that controls the facility 2. In this way, the control apparatus may run the corresponding equipment 21 in the facility 2 based on the reference signal. The control apparatus may run the equipment 21 in such a way as to achieve the state indicated by the reference signal.

According to the apparatus 4A in the system 1A described above, the modification content recommended to change the state of the facility 2 from an abnormal state indicated by the state indication value at the current time point to a normal state is identified for the modifiable data. Therefore, by automatically operating the facility 2 based on the identified modification content, it is possible to change the state of the facility 2 from an abnormal state to a normal state.

In addition, since a recommended range or recommended value is identified for the modifiable data, it is possible to reliably change the state of the facility 2 from an abnormal state to a normal state.

In addition, in a case where the modifiable data is operation data, a recommended range or recommended value for any type of measurement data recommended for changing the state of the facility 2 from an abnormal state to a normal state is identified. A content of the operation data associated with the identified recommended range or recommended value in the correspondence table 432A is then identified as the recommended modification content. Therefore, the modification content recommended for the operation data can be identified.

In addition, the plurality of synthetic data sets in closer proximity to the data set at the current time point than a reference approximation degree is acquired, and classified by the model 431 into a first state (in the present embodi-ment, as one example, an abnormal state) synthetic data set and a second state (in the present embodiment, as one example, a normal state) synthetic data set. The recommended modification content is then identified based on the difference vector from the coordinate point of the data set at the current time point to the coordinate point of the centroid of the plurality of second state synthetic data sets. Therefore, based on the positive or negative sign of each component of the difference vector, a modification content indicating whether the measurement data corresponding to said com-ponent should be modified in an increasing direction or a decreasing direction can be identified.

In addition, based on the classification result by the classification unit 4152, a linear model for classifying the plurality of data sets into either of first state synthetic data sets and second state synthetic data sets is generated. The intersection between the generated linear model and the difference vector is then further calculated, and the recom-mended modification content is identified. Therefore, based on the positive or negative sign of each component of the difference vector, a modification content indicating whether the measurement data corresponding to said component should be modified in an increasing direction or a decreasing direction can be identified, and the modification content indicating the reference value from which each measure-ment data should be increased or decreased can be identified based on the coordinate point of the intersection.

In addition, since an average coordinate point of the plurality of second state synthetic data sets among the plurality of data sets is defined as the coordinate point of the centroid of the plurality of second state synthetic data sets, the end point of the difference vector can be defined as the coordinate point with a higher possibility of being classified as the second state. Therefore, it is possible to further reliably change the state of the facility 2 from an abnormal state to a normal state.

In addition, in response to at least one of the distance between the coordinate point of the data set at the query point and the boundary for classification by the model 431 being larger than the reference distance, or the number of synthetic data sets classified as the second state synthetic data sets among the plurality of synthetic data sets being less than a reference number, the calculation unit 4154 is dis-abled. Therefore, in a case where the accuracy of the recommended modification content is low, it is possible to prevent the modification content from being identified.

2.2. Operation

Figure 11:
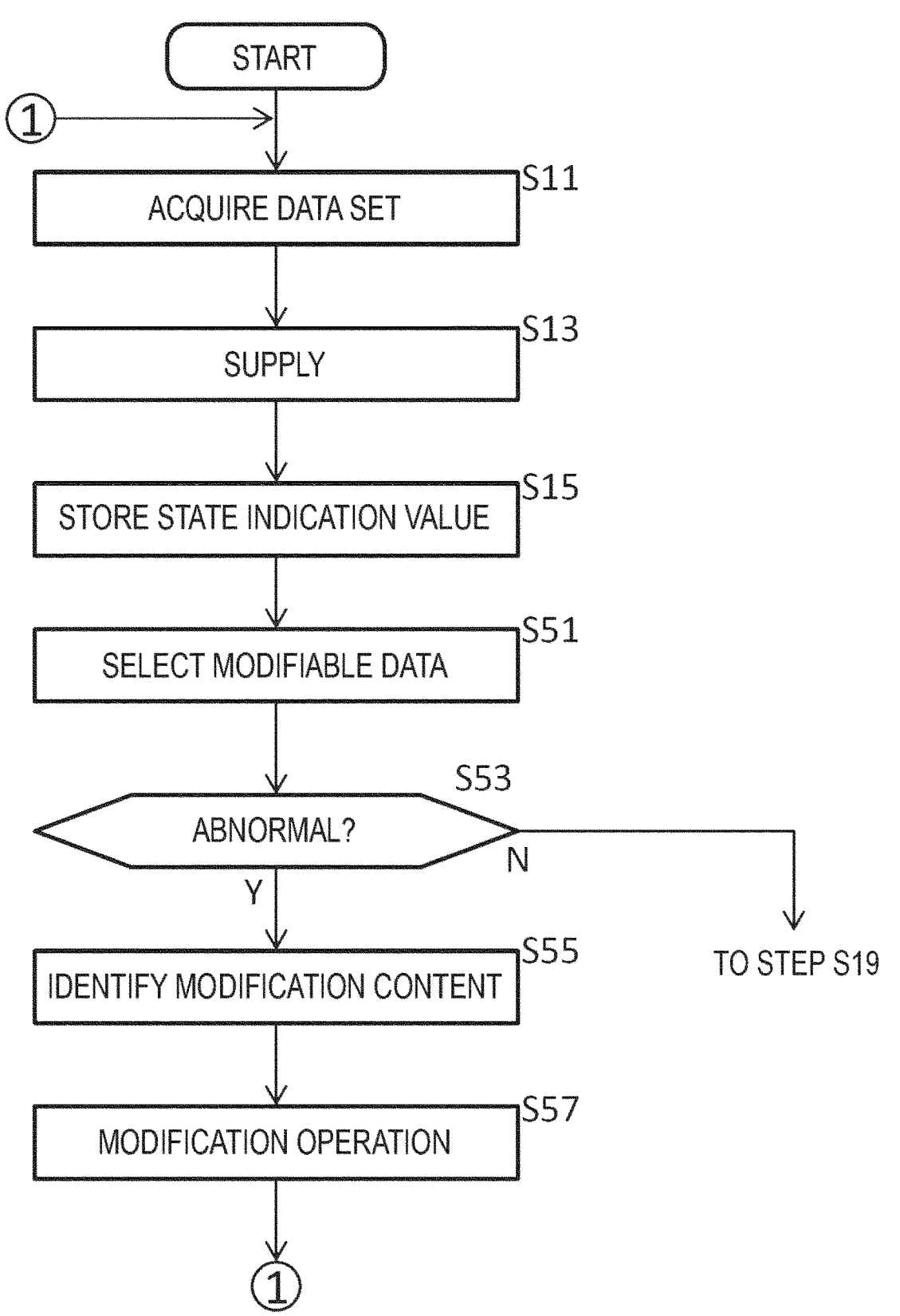
FIG. 11 illustrates an operation of an apparatus 4A.

FIG. 11 illustrates an operation of the apparatus 4A. The apparatus 4A assists monitoring of the facility 2 by the processing of steps S11 to S33, S51 to S57. It should be noted that, the processing of step S15 and beyond of the operation of the apparatus 4A is different from the operation of the apparatus 4.

At step S11, the acquisition unit 401 acquires a data set indicating the state of the facility 2. The acquisition unit 401 may acquire a measurement data set measured at the current time point. At step S13, the supplying unit 402 supplies the acquired data set to the model 431. In this manner, at step S15, a state indication value according to the state indicated by the data set is output from the model 431, and stored in the data file 430.

At step S51, the modification content identification unit 415 receive a selection operation of the modifiable data via the input unit 404. The modification content identification unit 415 may receive a selection operation of a plurality of types of modifiable data. The modification content identification unit 415 may further receive an operation of setting the tolerance for at least one modifiable data via the input unit 404.

At step S53, the modification content identification unit 415 determines whether it is indicated by the state indication value at the current time point output from the model 431 that the facility 2 is in the first state (in the present embodiment, as one example, an abnormal state). The modification content identification unit 415 may determine that it is indicated that the facility 2 is in the first state when the state indication value is a negative value. In a case where it is determined at step S53 that it was not indicated that the facility 2 is in the first state (step S53: No), the processing may proceed to the above-mentioned step S19. In this way, the factor data for the data set at the current time point may be identified. In a case where it is determined at step S53 that it was indicated that the facility 2 is in the first state (step S53: Yes), the processing may proceed to the above-mentioned step S55.

At step S55, the modification content identification unit 415 identifies, for each modifiable data, the modification content recommended to change the state of the facility 2 from the first state (in the present embodiment, as one example, an abnormal state) to the second state (in the present embodiment, as one example, a normal state). The modification content identification unit 415 may identify the modification content within the tolerance set for the modifiable data.

It should be noted that, in response to at least one of the distance between the coordinate point of the data set at the current time point and the boundary for classification by the model 431 being larger than the reference distance or the number of synthetic data sets classified as the second state data set among the plurality of synthetic data sets being less than a reference number, the control unit 4156 of the modification content identification unit 415 may stop the identification of the modification content. In this case, the control unit 4156 may cause the display unit 412 to display an error message and end the processing.

In addition, in a case where the modification contents for all the modifiable data are already realized at the current time point, the control unit 4156 of the identification execution unit 4155 may cause the display unit 412 to display an error message and end the processing.

At step S57, the output unit 416 outputs a reference signal indicating the modification content to the control apparatus of the facility 2. In this way, corresponding equipment 21 in the facility 2 is automatically operated. Additionally, or alternatively, the modification content may be displayed on the display unit 412. In this case, equipment 21 of the facility 2 may be operated manually by the operator. When the processing of step S57 is ended, the processing may proceed to the above-mentioned step S11.

2.3. Operation Example

Figure 12:
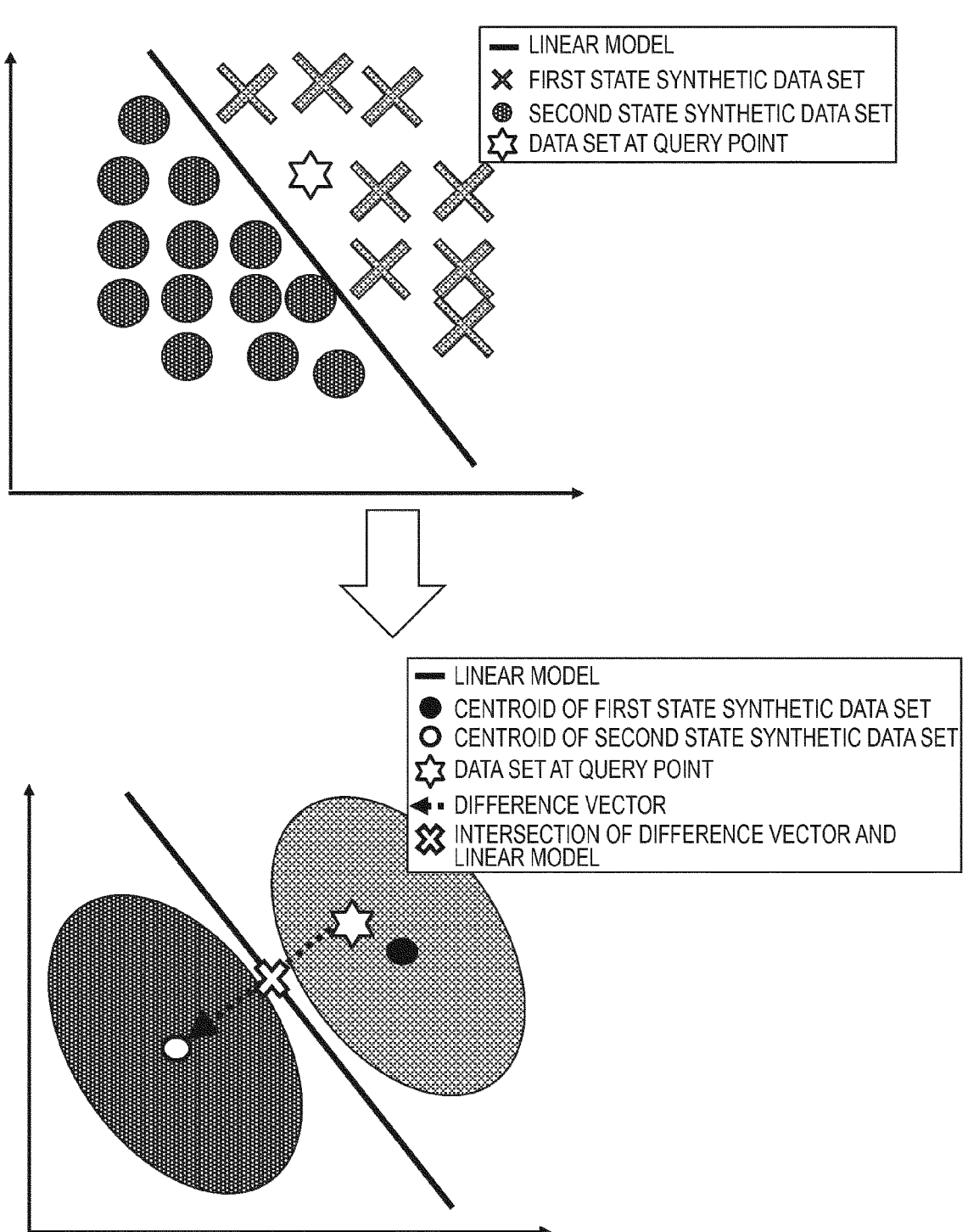
FIG. 12 illustrates an identification technique of the modification content by a modification content identification unit 415.

FIG. 12 illustrates an identification technique of the modification content by a modification content identification unit 415. It should be noted that, the coordinate axis in the graphs may represent the measurement value of the measurement data selected as the modifiable data.

As shown in the upper graph, when the data set at the query point (in the present embodiment, as one example, the current time point) is supplied to the acquisition unit 4151, a plurality of synthetic data sets in proximity to said data set may be generated by the acquisition unit 4151. In addition, the plurality of synthetic data sets generated may be classified into first state data sets or second state data sets by the classification unit 4152. Further, a linear model may be generated in the generating unit 4153 to classify these data sets in accordance with the classification by the classification unit 4152.

Subsequently, as shown in the lower graph, a centroid of the plurality of second synthetic data sets may be calculated by the calculation unit 4154, and a difference vector from the coordinate point of the data set at the query point to a coordinate point of said centroid may be calculated. In addition, the intersection between the difference vector and the linear model may be calculated by the calculation unit 4154. The recommended modification content may then be identified based on these difference vector and intersection.

FIG. 13 illustrates a selection screen of the modifiable data. At step S51, a selection table for selecting the modifiable data may be displayed on the display screen of the display unit 412. For each measurement data included in the data set, a checkbox for selecting said measurement data as the modifiable data may be displayed in the selection table. In addition, for each measurement data, an entry field of the upper limit value and the lower limit value for setting the tolerance may be displayed.

Figure 14:
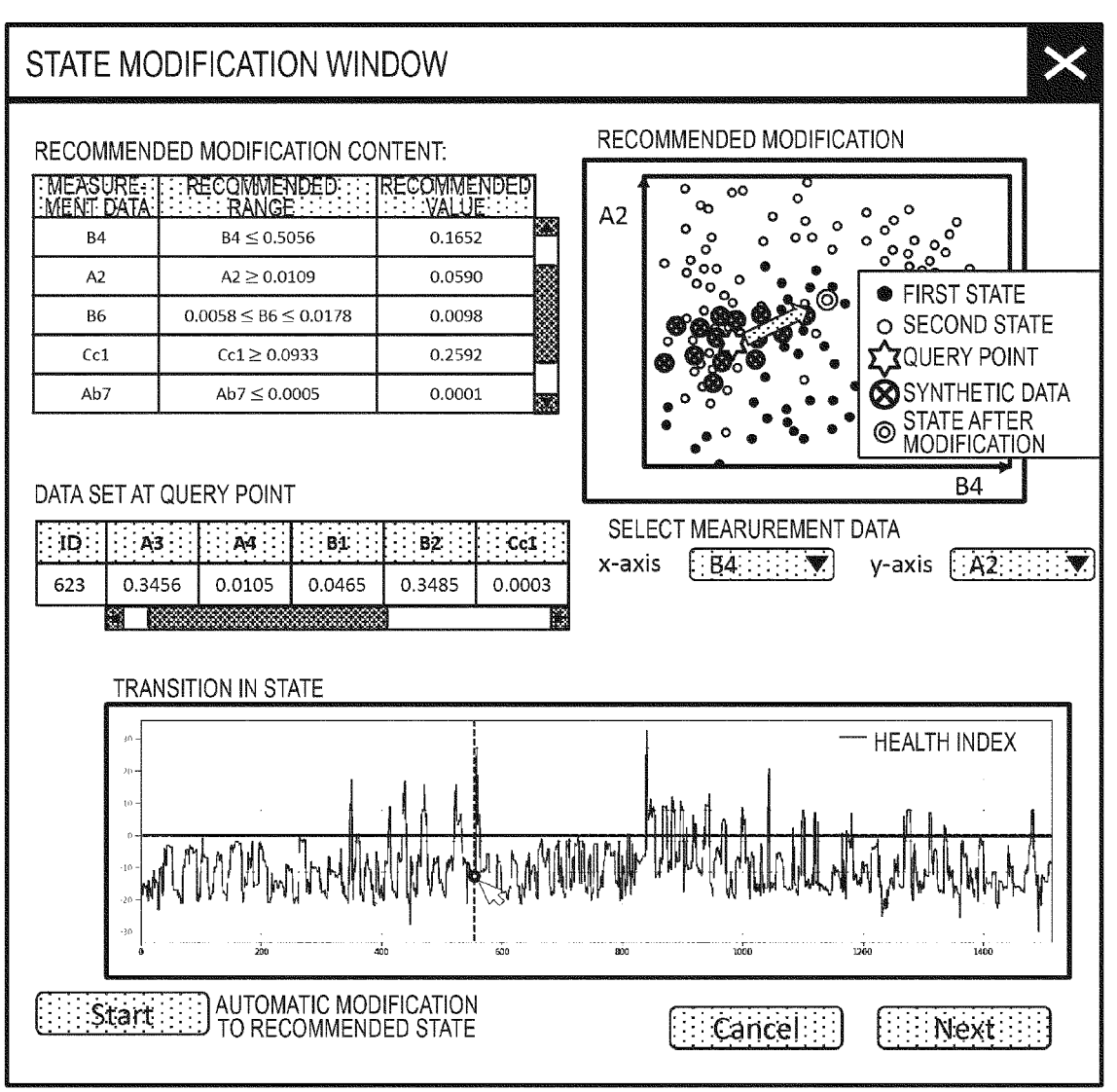
FIG. 14 illustrates an example of a display screen of the modification content.

FIG. 14 illustrates an example of a display screen of the modification content. At step S57, the recommended modification content may be displayed for each modifiable data on the display screen of the display unit 412 (see the upper left portion in the figure). The recommended modification content may be displayed as a recommended numerical range or may be displayed as a recommended value.

In addition, a scatter diagram of each data set and the data set at the query point in the coordinate space with the modifiable data as the coordinate axis may be displayed on the display screen of the modification content (see the upper right portion in the figure). Each data set in the scatter diagram may be displayed to be able to identify which of the first state and the second state it corresponds to. In addition, the synthetic data set generated by the acquisition unit 4151 may further be displayed in the scatter diagram. In addition, a moving path of the data set in a case where the recommended modification has been executed or the final data set after modification may further be displayed in the scatter diagram. The type of the modifiable data used for the coordinate axis may be changed via the input unit 404.

In addition, the content of the data set at the query point or a graph indicating the transition in the state indication value may further be displayed on the display screen of the modification content. In addition, a start button for starting an automatic modification operation by the output unit 416 may be displayed on the display screen of the modification content.

2.4. Variation of the Second Embodiment

It should be noted that, in the second embodiment described above, although description has been made that the calculation unit 4154 takes an average coordinate point of the second state data sets as the coordinate point of the centroid, it may take other coordinate points as the coordinate point of the centroid. For example, the calculation unit 4154 may take the coordinate point of the data set that is closest to the average coordinate point of the plurality of second state data sets among the plurality of data sets (as one example, the plurality of synthetic data sets) acquired by the acquisition unit 4151 as the coordinate point of the centroid of the plurality of second state data sets. In this way, the end point of the difference vector can be used as the coordinate point with a higher possibility of being classified as the second state. Therefore, it is possible to reliably change the state of the facility 2 from the first state to the second state.

In addition, in this case, the calculation unit 4154 may take the coordinate point of the second state data set that is closest to the average coordinate point of the second state data sets among the plurality of data sets acquired by the acquisition unit 4151 as the coordinate point of the centroid of the plurality of second state data sets. In this way, it is possible to reliably set the end point of the difference vector as the coordinate point to be classified as the second state. Therefore, it is possible to reliably change the state of the facility 2 from the first state to the second state.

Further, in this case, in response to the data set that is closest to the average coordinate point of the second state data sets among the plurality of data sets acquired by the acquisition unit 4151 being the first state data set, the control unit 4156 may cause the acquisition unit 4151 to further acquire the data sets. In this way, by classifying the plurality of data sets acquired again into first state data sets and second state data sets, the data set, among the plurality of data sets, that is closest to the average coordinate point of the second state data sets can be set as the second state data set.

In addition, although description has been made that, in response to at least one of the distance between the coordinate point of the data set at the query point and the boundary for classification by the model 431 being larger than the reference distance, or the number of synthetic data sets classified as the second state data sets among the plurality of synthetic data sets being less than a reference number, the control unit 4156 disables the identification execution unit 4155, it may perform other control. For example, instead of disabling the identification execution unit 4155, the control unit 4156 may cause the acquisition unit 4151 to increase the reference approximation degree until a number of data sets classified as the second state data set becomes equal to or higher than a reference number, to further acquire a data set. In this way, the acquired data set can be increased and a local consistency between the linear model and the original model 431 can be improved. Therefore, the accuracy of the recommended modification content can be increased. After performing the processing for causing the acquisition unit 4151 to increase the reference approximation degree to further acquire the data set up to reference number of times, the control unit 4156 may disable the identification execution unit 4155 in a case where the number of data sets classified as the second state data sets is less than the reference number.

In addition, in addition to, or instead of increasing the reference approximation degree to further acquire the data set, the control unit 4156 may cause the acquisition unit 4151 to further acquire a data set that is in close proximity to the data set that is closest to the data set at the query point, among the data sets classified as the second state data set, than the reference approximation degree. For example, the control unit 4156 may set the data set that is closest to the data set at the query point, among the data sets classified as the second state data set, as the temporary data set at the query point, and cause the data set that is in proximity to said temporary data set at the query point to be acquired. In this way, the data set in the vicinity of the boundary for classification by the original model 431 may be increased locally, and the local consistency between the linear model and the original model 431 can be reliably increased. Therefore, the accuracy of the recommended modification content can be reliably increased.

In addition, although description has been made that the modification content identification unit 415 includes the acquisition unit 4151, the classification unit 4152, and the generating unit 4153 performing operations in the same manner as the acquisition unit 4081, the classification unit 4082, and the generating unit 4083 of the factor identification unit 408, the acquisition unit 4081, the classification unit 4082 and the generating unit 4083 may be shared with the factor identification unit 408.

In addition, the modification content identification unit 415 may identify the recommended modification content with a technique other than that described above. For example, in a case where it is indicated by the state indication value that the facility 2 is in the first state (as one example, an abnormal state), the modification content identification unit 415 may use a learning algorithm for generating a counterfactual data set for changing the state of the facility 2 from a state corresponding to the data set at the query point to the second state (as one example, a normal state) to identify a modification content recommended for the modifiable data. Also in this case, the modification content that changes the state of the facility 2 from the first state to the second state can be reliably identified. It should be noted that, Dice, Nice, Prototypes, or the like, for example, can be used as the learning algorithm for generating the counterfactual data set. In a case where such a learning algorithm is used, the modification content identification unit 415 may use at least one evaluation value calculated for each counterfactual data set to identify any of the plurality of counterfactual data sets, and may consider the content of the identified counterfactual data set as the recommended modification content. For example, in a case where Dice is used as the learning algorithm, the modification content identification unit 415 may use, as the evaluation value calculated for the counterfactual data set, at least one of validity, proximity, sparsity, or diversity described in the following literature 4. Literature 4: Ramaravind et. al., "Explaining Machine Learning Classifiers through Diverse Counterfactuals Explanations", Internet <URL: https://arxiv.org/abs/1905.07697>.

In addition, although description has been made that the modification content identification unit 415 includes the generating unit 4153, it may not include the generating unit 4153. In this case, the identification execution unit 4155 may identify the recommended modification content based on the difference vector calculated by the calculation unit 4154.

In addition, although description has been made that the modification content identification unit 415 identifies the modification content for each modifiable data, it may identify the modification content only for some of the modifiable data. For example, the modification content identification unit 415 may identify the modification content only for the factor data, among the plurality of modifiable data, at the query point identified by the factor identification unit 408 (as one example, factor data having a larger degree of influence than a reference degree of influence). In this case, the apparatus 4A may perform the processing of step S19 between step S53 and step S55 to identify the factor data.

In addition, although description has been made with the query point being the current time point, it may be a past time point. In this case, the modification content identification unit 415 may identify a recommended modification content for the modifiable data at a past time point selected as the query point. The modification content identification unit 415 may cause the display unit 412 to display the identified modification content via the display control unit

411. In this way, the recommended modification content at the past time point can be grasped.

In addition, in a case where the current or past time point is selected as the query point, the processing of steps S51 to S57 may be performed between step S17 and step S19. In addition, in this case, a selection table of the modifiable data (see FIG. 13) may be included in the selection screen of the query point (see FIG. 4).

In addition, although description has been made with the first state being an abnormal state and the second state being a normal state, the first state may be the normal state and the second state may be the abnormal state. In addition, although description has been made that the modification content identification unit 415 identifies the modification content in response to a state indication value indicating an abnormal state being output, the modification content identification unit 415 may identify the modification content in response to being instructed by the operator to identify the modification content, regardless of the state indicated by the state indication value.

In addition, although description has been made that the selection of the modifiable data is performed in advance before the state indication value indicating the first state is output, the selection of the modifiable data may be performed after the state indication value indicating the first state has been output.

3. Other Variations

It should be noted that, although, in the above-described first embodiment and the above-described second embodiment, description has been made that each data set includes a plurality of types of measurement data, each data set may further include operation data corresponding to said plurality of types of measurement data. In this way, in a case where operation data is selected as the modifiable data, the modification content recommended for the operation data can be reliably identified. The operation data corresponding to the measurement data may be operation data corresponding to the same time point as the measurement data, and as one example, may be operation data of the operation that was performed at the measurement time point of the measurement data.

In addition, although description has been made that the apparatus 4 includes the storage unit 403, the input unit 404, the labelling unit 405, the sign detection unit 409, the improvement operation identification unit 410, the display control unit 411, and the display unit 412, the apparatus 4 may not include any of the above. Similarly, although description has been made that the apparatus 4A includes the storage unit 403A, the input unit 404, the labelling unit 405, the factor identification unit 408, the sign detection unit 409, the improvement operation identification unit 410, the display control unit 411, and the display unit 412, the apparatus 4A may not include any of the above. For example, in a case where the storage unit 403 is not included, the apparatus 4, 4A may be externally connected a storage device for storing the content in the same manner as the storage unit 403.

In addition, although description has been made that the acquisition unit 401 sequentially acquires measurement data from the facility 2, the acquisition unit 401 may collectively acquire the measurement data stored in a storage device.

In addition, although description has been made that the improvement operation identification unit 410 identifies an improvement operation in a case where a sign of a poor state is detected, the improvement operation identification unit

410 may identify the improvement operation in a case where the state indication value is lower than the threshold.

In addition, although description has been made that the sign detection unit 409 compares the distribution of the state indication value with the reference distribution to detect the sign, additionally or alternatively, the sign detection unit 409 may compare the state indication value with a preset threshold to detect the sign. In a case where the sign is detected by comparison of the distribution of the state indication value with the reference distribution and comparison of the state indication value with the threshold, the sign may be detected by taking a logical sum of the two comparison results, or the sign may be detected by taking the logical product thereof. In a case where the state indication value is compared with the threshold, the sign detection unit 409 may detect the sign by comparing the moving average of the state indication value with a preset threshold. The moving average of the state indication value may be a moving average of the state indication value output from the model 431 within the reference time period, and may be, as one example, a moving average of the state indication value output within the most recent reference time period. In a case where the moving average of the state indication value is compared with the threshold to detect the sign, it is possible to prevent the detection of the sign from becoming unstable due to variation in the state indication value near the threshold. Here, the threshold may be set based on the boundary value between the state indication value indicating that the facility 2 is in a good state and the state indication value indicating that the facility 2 is in a poor state. As one example, in a case where the state indication value indicating that the facility 2 is in a good state is a positive value, the state indication value indicating that the facility 2 is in a poor state is a negative value, and the boundary value is zero, the threshold may be a positive value obtained by adding a reference margin to zero.

In addition, although description has been made that the object is the facility 2, the object may be other objects. For example, the object may be a product manufactured at the facility 2, the object may be a furniture or apparatus that is not fixed and is movable, may be a natural object such as a living body, may be natural environment such as the weather or topography, or may be natural phenomenon such as chemical reactions or biochemical reactions.

In addition, various embodiments of the present invention may be described with reference to flow charts and block diagrams, where blocks may represent (1) steps of processes in which operations are executed or (2) sections of apparatuses responsible for performing operations. Certain steps and sections may be implemented by dedicated circuitry, programmable circuitry supplied with computer-readable instructions stored on computer-readable media, and/or processors supplied with computer-readable instructions stored on computer-readable media. Note that dedicated circuitry may include digital and/or analog hardware circuits, and may include integrated circuits (IC) and/or discrete circuits. Programmable circuitry may include reconfigurable hardware circuits comprising logical AND, OR, XOR, NAND, NOR, and other logical operations, flip-flops, registers, memory elements, etc., such as field-programmable gate arrays (FPGA), programmable logic arrays (PLA), and the like.

A computer-readable medium may include any tangible device that can store instructions to be executed by a suitable device, and as a result, the computer-readable medium having instructions stored thereon comprises an article of manufacture including instructions which can be executed to create means for performing operations specified in the flow charts or block diagrams. Examples of computer-readable media may include an electronic storage medium, a magnetic storage medium, an optical storage medium, an electromagnetic storage medium, a semiconductor storage medium, etc. More specific examples of the computer-readable medium may include a Floppy (registered trademark) disk, a diskette, a hard disk, a random access memory (RAM), a read-only memory (ROM), an erasable programmable read-only memory (EPROM or Flash memory), an electrically erasable programmable read-only memory (EEPROM), a static random access memory (SRAM), a compact disc read-only memory (CD-ROM), a digital versatile disk (DVD), a BLU-RAY (registered trademark) disc, a memory stick, an integrated circuit card, and the like.

Computer-readable instructions may include assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk(registered trademark), JAVA (registered trademark), C++, etc., and conventional procedural programming languages, such as the "C" programming language or similar programming languages.

Computer-readable instructions may be provided to a processor of a general purpose computer, special purpose computer, or other programmable data processing apparatus, or to a programmable circuitry, locally or via a local area network (LAN), wide area network (WAN) such as the Internet, or the like, to execute the computer-readable instructions to create means for performing operations specified in the flow charts or block diagrams. Examples of the processor include a computer processor, a processing unit, a microprocessor, a digital signal processor, a controller, a microcontroller, and the like.

Figure 15:
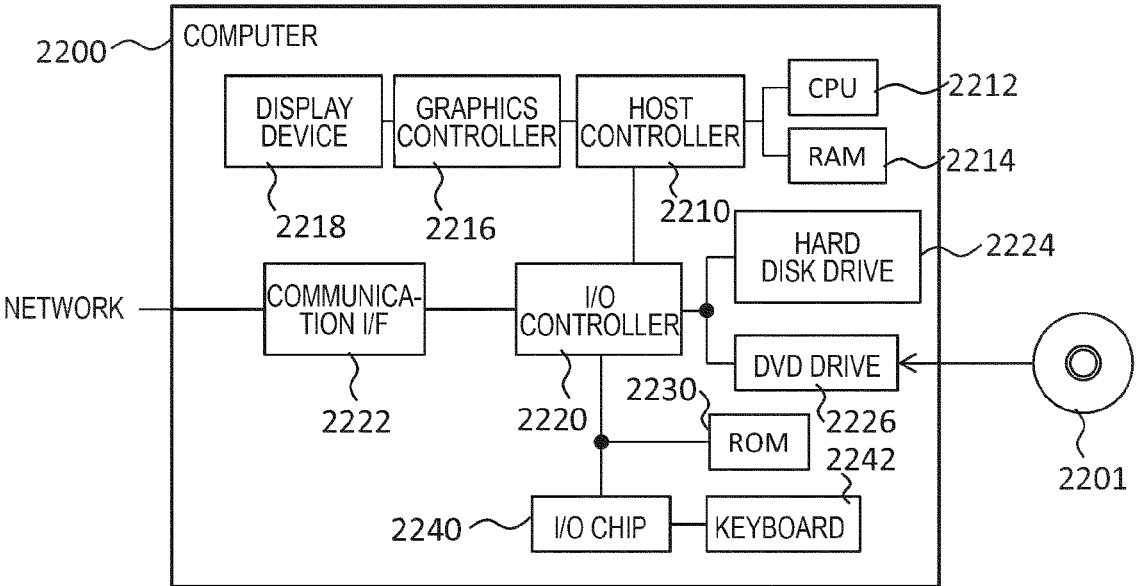
FIG. 15 illustrates a computer 2200 in which a plurality of aspects of the present invention may be entirely or partially embodied.

FIG. 15 illustrates an example of the computer 2200 in which a plurality of aspects of the present invention entirely or partially may be embodied. A program installed on the computer 2200 can cause the computer 2200 to function as an operation associated with an apparatus according to embodiments of the present invention or as one or more sections of the apparatus, or to perform the operation or the one or more sections and/or can cause the computer 2200 to perform processes according to embodiments of the present invention or steps of the processes. Such a program may be executed by a CPU 2212 to cause the computer 2200 to perform particular operations associated with some or all blocks in the flow charts or block diagrams described herein.

The computer 2200 according to the present embodiment includes a CPU 2212, a RAM 2214, a graphics controller 2216 and a display device 2218, which are connected to each other by a host controller 2210. The computer 2200 also includes input/output units such as a communication interface 2222, a hard disk drive 2224, a DVD-ROM drive 2226 and an IC card drive, which are connected to the host controller 2210 via an input/output controller 2220. The computer also includes legacy input/output units such as a ROM 2230 and a keyboard 2242, which are connected to the input/output controller 2220 via an input/output chip 2240.

The CPU 2212 operates in accordance with programs stored in the ROM 2230 and the RAM 2214, and controls each unit accordingly. The graphics controller 2216 acquires image data generated by the CPU 2212 on a frame buffer or the like provided in the RAM 2214 or in the graphics controller 2216 itself, and displays the image data on the display device 2218.

The communication interface 2222 communicates with other electronic devices via a network. The hard disk drive 2224 stores programs and data to be used by the CPU 2212 in the computer 2200. The DVD-ROM drive 2226 reads programs or data from the DVD-ROM 2201, and provides the programs or data to the hard disk drive 2224 via the RAM 2214. The IC card drive reads the program and data from the IC card, and/or writes the program and data to the IC card.

The ROM 2230 has stored therein a boot program or the like to be executed by the computer 2200 at the time of activation, and/or a program that depends on the hardware of the computer 2200. The input/output chip 2240 may also connect various input/output units to the input/output controller 2220 via a parallel port, a serial port, a keyboard port, a mouse port or the like.

Programs are provided by a computer-readable medium such as the DVD-ROM 2201 or an IC card. The programs are read from the computer-readable medium, installed on the hard disk drive 2224, the RAM 2214 or the ROM 2230, which are also examples of a computer-readable medium, and executed by the CPU 2212. The information processing described in these programs is read into the computer 2200, resulting in cooperation between a program and the above-mentioned various types of hardware resources. An apparatus or method may be constituted by realizing the operation or processing of information in accordance with the usage of the computer 2200.

For example, if a communication is performed between the computer 2200 and external devices, the CPU 2212 may execute a communication program loaded on the RAM 2214, and instruct the communication interface 2222 to perform communication process based on the process described in the communication program. Under the control of the CPU 2212, the communication interface 2222 reads transmission data stored in a transmission buffer region provided in a recording medium such as the RAM 2214, the hard disk drive 2224, the DVD-ROM 2201 or an IC card, and sends the read transmission data to the network, or writes reception data received from the network into a reception buffer region or the like provided in the recording medium.

The CPU 2212 may also make all or required portions of the files or databases stored in an external recording medium such as the hard disk drive 2224, the DVD-ROM drive 2226 (DVD-ROM 2201) or an IC card to be read by the RAM 2214, and perform various types of processing on the data on the RAM 2214. The CPU 2212 may be configured to write back the processed data to the external recording medium.

Various types of information such as various types of programs, data, tables and databases may be stored in the recording medium for information processing. The CPU 2212 may also be configured to execute various types of processing on the data read from the RAM 2214, which includes various types of operations, processing of information, condition judging, conditional branching, unconditional branching, search/replacement of information and the like described in the present disclosure and designated by an instruction sequence of programs, and to write the result back to the RAM 2214. The CPU 2212 may also be configured to search for information in a file, a database, etc., in the recording medium. For example, when a plurality of entries, each having an attribute value of a first attribute associated with an attribute value of a second attribute, are stored in the recording medium, the CPU 2212 may search the plurality of entries for an entry whose attribute value of the first attribute matches a designated condition, read the attribute value of the second attribute stored in the entry, and thereby acquire the attribute value of the second attribute associated with the first attribute that meets a predetermined condition.

The programs or software modules in the above description may be stored on the computer 2200 or a computer-readable medium near the computer 2200. Furthermore, a recording medium such as a hard disk or a RAM provided in a server system connected to a dedicated communication network or the Internet can be used as a computer-readable media, which provides programs to the computer 2200 via the network.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

EXPLANATION OF REFERENCES

1: system,
2: facility,
4: apparatus,
20: sensor,
21: equipment,
401: acquisition unit,
402: supplying unit,
403: storage unit,
404: input unit,
405: labelling unit,
408: factor identification unit,
409, sign detection unit,
410: improvement operation identification unit,
411: display control unit,
412: display unit,
415: modification content identification unit,
416: output unit,
430: data file,
431: model,
432: correspondence table,
2200: computer,
2201: DVD-ROM,
2210: host controller,
2212: CPU,
2214: RAM,
2216: graphics controller,
2218: display device,
2220: input/output controller,
2222: communication interface,
2224: hard disk drive,

2226: DVD-ROM drive,
2230: ROM,
2240: input/output chip,
2242: keyboard,
4081: acquisition unit,
4082: classification unit,
4083: generating unit,
4085: identification execution unit,
4151: acquisition unit,
4152: classification unit,
4153: generating unit,
4154: calculation unit,
4155: identification execution unit,
4156: control unit.

What is claimed is:

1. An apparatus comprising:
a first acquisition unit configured to acquire a plurality of data sets each including corresponding measurement values for a plurality of types of measurement data indicating a state of an object, each of the plurality of data sets being acquired at a corresponding one of a plurality of measurement times;
a supplying unit configured to supply, in response to each of the plurality of the data sets being input, each of the plurality of data sets acquired by the first acquisition unit to a model that outputs a corresponding state indication value indicating classification of the state of the object for each of the plurality of data sets;
a first identification unit configured to identify, in a case where the corresponding state indication value is output from the model in response to one of the plurality of data sets being supplied, at least one type of measurement data, among the plurality of types of measurement data, having a larger influence on the corresponding state indication value than a reference, based on the one of the plurality of data sets; and
a display control unit configured to display the corresponding state indication value and the at least one type of measurement data along with each other;
wherein the first identification unit includes:
a generating unit configured to generate a simplified model in which the model is simplified in a region including a coordinate point of the one of the plurality of data sets;
a first identification execution unit configured to perform identification of the at least one type of measurement data based on the simplified model generated; and
a second acquisition unit configured to acquire a plurality of second acquisition unit data sets in a closer proximity to the one of the plurality of data sets than a reference proximity degree,
wherein the generating unit is configured to use the plurality of second acquisition unit data sets acquired by the second acquisition unit to generate the simplified model.

2. The apparatus according to claim 1, wherein the first identification unit is configured to perform identification of the at least one type of measurement data by each of a plurality of algorithms for calculating a degree of influence of each type of measurement data in the one of the plurality of data sets on the corresponding state indication value,
wherein the display control unit is configured to display, for each algorithm used by the first identification unit, the type of measurement data that has been identified.

3. The apparatus according to claim 2, wherein the first identification unit is configured to calculate a performance indication value of each of the plurality of algorithms, and the display control unit is configured to display, for each of the algorithms used by the first identification unit, the performance indication value of the algorithm.

4. The apparatus according to claim 2, wherein the first identification unit is configured to calculate a degree of influence of the type of measurement data identified by each algorithm on the corresponding state indication value, and the display control unit is configured to normalize and display a degree of influence of the type of measurement data identified by each algorithm on the corresponding state indication value.

5. The apparatus according to claim 1, further comprising:

a second identification unit configured to identify, based on the one of the plurality of data sets, modification content recommended to change the state of the object from a first state indicated by the corresponding state indication value to a second state for one or more selected data that is selected from the plurality of types of measurement data and operation data indicating an operation performed on the object.

6. An apparatus comprising:

a first acquisition unit configured to acquire a plurality of data sets each including corresponding measurement values for a plurality of types of measurement data indicating a state of an object, each of the plurality of data sets being acquired at a corresponding one of a plurality of measurement times;

a supplying unit configured to supply, in response to each of the plurality of the data sets being input, each of the plurality of data sets acquired by the first acquisition unit to a model that outputs a corresponding state indication value indicating classification of the state of the object for each of the plurality of data sets; and a second identification unit configured to, in a case where the corresponding state indication value is output from the model in response to one of the plurality of data sets being supplied, identify, based on the one of the plurality of data sets, modification content recommended to change the state of the object from a first state indicated by the corresponding state indication value to a second state for one or more selected data that is selected from the plurality of types of measurement data and operation data indicating an operation performed on the object; wherein the second identification unit includes:

a third acquisition unit configured to acquire a plurality of third acquisition unit data sets that is in closer proximity to the one of the plurality of data sets than a reference approximation degree;

a classification unit configured to classify, by using the model, the plurality of third acquisition unit data sets acquired by the third acquisition unit into a plurality of first state data sets each corresponding to the first state and a plurality of second state data sets each corresponding to the second state;

a calculation unit configured to calculate a vector from a coordinate point of the one of the plurality of data sets to a coordinate point of a centroid of the plurality of the second state data sets; and a second identification execution unit configured to identify the recommended modification content based on the vector.

7. The apparatus according to claim 6, wherein the second identification unit includes:

a generating unit configured to generate a linear model for classifying the plurality of data sets into either one of the plurality of first state data sets and the plurality of second state data sets, based on a classification result by the classification unit, wherein the calculation unit is configured to further calculate an intersection of the vector and the linear model, and the second identification execution unit is configured to identify the recommended modification content based on the vector and the intersection.

8. The apparatus according to claim 6, wherein the calculation unit is configured to define, as a coordinate point of the centroid, an average coordinate point of the plurality of the second state data sets.

9. The apparatus according to claim 6, wherein the calculation unit is configured to define, as a coordinate point of the centroid, a coordinate point of one of the plurality of second state data sets that is closest to an average coordinate point of the plurality of the second state data sets.

10. The apparatus according to claim 9, wherein the second identification unit includes:

a control unit configured to cause the third acquisition unit to further acquire an additional third acquisition unit data set, in response to a data set from among the plurality of third acquisition unit data sets that is closest to the average coordinate point of the plurality of the second state data sets being one of the plurality of first state data sets.

11. The apparatus according to claim 6, wherein the second identification unit includes:

a control unit configured to cause, in response to at least one of a distance between a coordinate point of the one of the plurality of data sets and a boundary for classifying each of the plurality of data sets into the plurality of first state data sets and the plurality of second state data sets by the model being greater than a reference distance, or, a number of the plurality of second state data sets being less than a reference number, the third acquisition unit to further increase the reference approximation degree until the number of the plurality of second state data sets becomes equal to or higher than a reference number.

12. The apparatus according to claim 6, wherein the second identification unit includes:

a control unit configured to cause, in response to at least one of a distance between a coordinate point of the one of the plurality of data sets and a boundary for classifying each of the plurality of data sets into the plurality of first state data sets and the plurality of second state data sets by the model being greater than a reference distance, or, a number of the plurality of second state data sets being less than a reference number, the third acquisition unit to further acquire an additional third acquisition unit data set, which is classifiable as a second state data set based on its corresponding state indication value, that is in closer than the reference approximation degree to a data set from the plurality of second state data sets that is closest to the one of the plurality of data sets.

13. The apparatus according to claim 6, wherein the second identification unit includes:

a control unit configured to disable the second identification execution unit in response to at least one of a distance between a coordinate point of the one of the plurality of data sets and a boundary for classifying each of the plurality of data sets into the plurality of first state data sets and the plurality of second state data sets by the model being greater than a reference distance, or, a number of the plurality of second state data sets being less than a reference number.

14. The apparatus according to claim 5, wherein, when the state of the object corresponding to the one of the plurality of data sets is the first state, the second identification unit is configured to identify the recommended modification content by using a learning algorithm that generates a counterfactual data set for changing the state of the object from a state corresponding to the one of the plurality of data sets to the second state.

15. The apparatus according to claim 5, wherein the second identification unit is configured to identify a recommended range or value for the selected data.

16. The apparatus according to claim 5, further comprising:

a storage unit configured to store, for each range or value of a measurement value of each of the plurality of types of measurement data, a content of the operation data for setting the measurement value of each of the plurality of types of measurement data to be within the range or to be the value, in association with each other, wherein the second identification unit is configured to identify, in a case where the selected data is selected from the operation data, a recommended range or recommended value of any type of measurement data that is recommended to change the state of the object from the first state to the second state, and identify, as the modification content, content of the operation data associated with the identified recommended range or recommended value.

17. The apparatus according to claim 5, wherein each of the plurality of data sets includes the corresponding measurement values for the plurality of types of measurement data and the operation data corresponding to the corresponding measurement values for the plurality of types of measurement data.

18. The apparatus according to claim 5, further comprising a display control unit configured to display the recommended modification content.

19. The apparatus according to claim 5, further comprising an output unit configured to output a signal indicating the recommended modification content to a control apparatus that controls the object.

20. A method comprising:

first acquiring including acquiring a plurality of data sets each including corresponding measurement values for a plurality of types of measurement data indicating a state of an object, each of the plurality of data sets being acquired at a corresponding one of a plurality of measurement times;

supplying, in response to each of the plurality of the data sets being input, each of the plurality of data sets acquired in the first acquiring to a model that outputs a corresponding state indication value indicating classification of the state of the object for each of the plurality of data sets;

first identifying including identifying, in a case where the corresponding state indication value is output from the model in response to one of the plurality of data sets being supplied, at least one type of measurement data, among the plurality of types of measurement data, having a larger influence on the corresponding state indication value than a reference, based on the one of the plurality of data sets; and controlling display by displaying the corresponding state indication value and the at least one type of measurement data along with each other;

wherein the first identifying includes:

generating a simplified model in which the model is simplified in a region including a coordinate point of the one of the plurality of data sets;

performing an identification of the at least one type of measurement data based on the simplified model generated; and a second acquiring, including acquiring a plurality of second acquired data sets in a closer proximity to the one of the plurality of data sets than a reference proximity degree, wherein the generating the simplified model includes using the plurality of second acquired data sets acquired by the second acquiring to generate the simplified model.

21. A method comprising:

first acquiring including acquiring a plurality of data sets each including corresponding measurement values for a plurality of types of measurement data indicating a state of an object, each of the plurality of data sets being acquired at a corresponding one of a plurality of measurement times;

supplying, in response to each of the plurality of the data sets being input, each of the plurality of data sets acquired in the first acquiring to a model that outputs a corresponding state indication value indicating classification of the state of the object for each of the plurality of data sets; and a second identifying including identifying, in a case where the corresponding state indication value is output from the model in response to one of the plurality of data sets being supplied, based on the one of the plurality of data sets, modification content recommended to change the state of the object from a first state indicated by the corresponding state indication value to a second state for one or more selected data that is selected from the plurality of types of measurement data and operation data indicating an operation performed on the object;

wherein the second identifying includes:

a third acquiring including acquiring a plurality of third acquiring data sets that is in closer proximity to the one of the plurality of data sets than a reference approximation degree;

classifying, by using the model, the plurality of third acquiring unit data sets acquired by the third acquiring into a plurality of first state data sets each corresponding to the first state and a plurality of second state data sets each corresponding to the second state;

calculating a vector from a coordinate point of the one of the plurality of data sets to a coordinate point of a centroid of the plurality of the second state data sets; and a second identifying including identifying the recommended modification content based on the vector.

22. A computer-readable storage medium that causes a computer to function as:

a first acquisition unit configured to acquire a plurality of data sets each including corresponding measurement values for a plurality of types of measurement data indicating a state of an object, each of the plurality of data sets being acquired at a corresponding one of a plurality of measurement times;

a supplying unit configured to supply, in response to each of the plurality of the data sets being input, each of the plurality of data sets acquired by the first acquisition unit to a model that outputs a corresponding state indication value indicating classification of the state of the object for each of the plurality of data sets;

a first identification unit configured to identify, in a case where the corresponding state indication value is output from the model in response to one of the plurality of data sets being supplied, at least one type of measurement data, among the plurality of types of measurement data, having a larger influence on the corresponding state indication value than a reference, based on the one of the plurality of data sets; and a display control unit configured to display the corresponding state indication value and the at least one type of measurement data along with each other;

wherein the first identification unit includes:

a generating unit configured to generate a simplified model in which the model is simplified in a region including a coordinate point of the one of the plurality of data sets;

a first identification execution unit configured to perform identification of the at least one type of measurement data based on the simplified model generated; and a second acquisition unit configured to acquire a plurality of second acquisition unit data sets in a closer proximity to the one of the plurality of data sets than a reference proximity degree, wherein the generating unit is configured to use the plurality of second acquisition unit data sets acquired by the second acquisition unit to generate the simplified model.

23. A computer-readable storage medium that causes a computer to function as:

a first acquisition unit configured to acquire a plurality of data sets each including corresponding measurement values for a plurality of types of measurement data indicating a state of an object, each of the plurality of data sets being acquired at a corresponding one of a plurality of measurement times;

a supplying unit configured to supply, in response to each of the plurality of the data sets being input, each of the plurality of data sets acquired by the first acquisition unit to a model that outputs a corresponding state indication value indicating classification of the state of the object for each of the plurality of data sets; and a second identification unit configured to, in a case where the corresponding state indication value is output from the model in response to one of the plurality of data sets being supplied, identify, based on the one of the plurality of data sets, modification content recommended to change the state of the object from a first state indicated by the corresponding state indication value to a second state for one or more selected data that is selected from the plurality of types of measurement data and operation data indicating an operation performed on the object;

wherein the second identification unit includes:

a third acquisition unit configured to acquire a plurality of third acquisition unit data sets that is in closer proximity to the one of the plurality of data sets than a reference approximation degree;

a classification unit configured to classify, by using the model, the plurality of third acquisition unit data sets acquired by the third acquisition unit into a plurality of first state data sets each corresponding to the first state and a plurality of second state data sets each corresponding to the second state;

a calculation unit configured to calculate a vector from a coordinate point of the one of the plurality of data sets to a coordinate point of a centroid of the plurality of the second state data sets; and a second identification execution unit configured to identify the recommended modification content based on the vector.

* * * * *